(12) United States Patent
Agarwal et al.

(10) Patent No.: US 11,643,756 B1
(45) Date of Patent: May 9, 2023

(54) METHOD FOR FABRICATING A HYBRID CARBON NANOFIBER PRODUCT

(71) Applicants: Arvind Agarwal, Miami, FL (US); Ambreen Nisar, Miami, FL (US); Lihua Lou, Miami, FL (US); Benjamin Peter Boesl, Miami, FL (US)

(72) Inventors: Arvind Agarwal, Miami, FL (US); Ambreen Nisar, Miami, FL (US); Lihua Lou, Miami, FL (US); Benjamin Peter Boesl, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/809,059

(22) Filed: Jun. 27, 2022

(51) Int. Cl.

| | |
|---|---|
| *C08J 3/21* | (2006.01) |
| *C08K 3/11* | (2018.01) |
| *C08K 3/14* | (2006.01) |
| *C08K 3/28* | (2006.01) |
| *C08K 3/38* | (2006.01) |
| *D01F 1/02* | (2006.01) |
| *D01F 9/20* | (2006.01) |
| *D01F 9/21* | (2006.01) |
| *D01F 9/24* | (2006.01) |
| *D01F 9/26* | (2006.01) |
| *D01F 9/28* | (2006.01) |
| *D01F 9/30* | (2006.01) |
| *D01F 9/22* | (2006.01) |
| *C09K 5/14* | (2006.01) |
| *D01D 1/02* | (2006.01) |
| *D01D 5/00* | (2006.01) |
| *D04H 3/007* | (2012.01) |
| *D04H 3/03* | (2012.01) |
| *D06C 7/04* | (2006.01) |
| *D01F 1/10* | (2006.01) |
| *C08J 3/20* | (2006.01) |

(52) U.S. Cl.
CPC ............ *D01F 9/22* (2013.01); *C08J 3/203* (2013.01); *C08J 3/212* (2013.01); *C09K 5/14* (2013.01); *D01D 1/02* (2013.01); *D01D 5/003* (2013.01); *D01D 5/0038* (2013.01); *D01F 1/10* (2013.01); *D01F 9/245* (2013.01); *D04H 3/007* (2013.01); *D04H 3/03* (2013.01); *D06C 7/04* (2013.01); *D01F 9/225* (2013.01); *D10B 2101/12* (2013.01); *D10B 2101/122* (2013.01); *D10B 2503/00* (2013.01)

(58) Field of Classification Search
CPC ...... B29B 7/08; C08J 3/203; C08J 3/21; C08J 3/212; C08K 3/11; C08K 3/14; C08K 3/28; C08K 3/38; D01D 1/02; D01D 5/003; D01D 5/0038; D01D 5/0046; D01F 1/02; D01F 1/10; D01F 9/20; D01F 9/21; D01F 9/22; D01F 9/225; D01F 9/24; D01F 9/245; D01F 9/26; D01F 9/28; D01F 9/30; D10B 2101/12
USPC ..... 264/29.2, 29.7, 211, 349, 442, 464, 465, 264/466, 484; 423/447.1, 447.8; 523/300; 524/404, 413, 424, 428
See application file for complete search history.

(56) References Cited

U.S. PATENT DOCUMENTS

| | | | | |
|---|---|---|---|---|
| 2006/0223696 | A1* | 10/2006 | Miyoshi | D01F 1/10 502/159 |
| 2007/0035055 | A1* | 2/2007 | Gee | D01D 5/003 264/29.7 |
| 2015/0076742 | A1* | 3/2015 | Joo | D01D 1/02 264/433 |
| 2020/0289714 | A1* | 9/2020 | Snell | A61F 2/30771 |
| 2020/0392048 | A1* | 12/2020 | van Hassel | C04B 35/62227 |

FOREIGN PATENT DOCUMENTS

| | | | | |
|---|---|---|---|---|
| CN | 103803490 A | * | 5/2014 | Y02E 60/10 |

OTHER PUBLICATIONS

Yi Hou et al., Enhanced Flexibility and Microwave Absorption Properties of HfC/SiC Nanofiber Mats, ACS Applied Materials & Interfaces, 2018, pp. 29876-29883, 2018, 8 pages.

Harold O. Lee et al., Fabrication of Tantalum and Hafnium Carbide Fibers via ForcespinningTM for Ultrahigh-Temperature Applications, Hindawi Advances in Materials Science and Engineering, vol. 2021, Article ID 6672746, 9 pages.

Hui Zhu et al., Effect of carbon fiber crystallite size on the formation of hafnium carbide coating and the mechanism of the reaction of hafnium with carbon fibers, Carbon 115, pp. 640-648, 2017, 9 pages.

Niranjan Patra et al., Thermal properties of Cf/HfC and Cf/HfC-SiC composites prepared by precursor infiltration and pyrolysis, Journal of the European Ceramic Society, 38, pp. 2297-2303, 2018, 7 pages.

* cited by examiner

*Primary Examiner* — Leo B Tentoni
(74) *Attorney, Agent, or Firm* — Saliwanchik, Lloyd & Eisenschenk

(57) ABSTRACT

Hybrid carbon nanofiber (Cnf) products (e.g., mats, yarns, webs, etc.) and methods of fabricating the same are provided. The hybrid Cnf products are flexible and lightweight and have high thermal conductivity. An electrospinning process can be used to fabricate the hybrid Cnf products and can include preparation of an electrospinning solution, electrospinning, and carbonization (e.g., under a vacuum condition).

12 Claims, 30 Drawing Sheets

|  | Products | Method | Properties |
|---|---|---|---|
| Method 1 | HfC/SiC nanofiber mats | ◆ Electrospinning<br>◆ Precursor: hafnium (IV) acetylacetonate (max 6.3 wt.%)<br>◆ Pyrolyzation temperature of 1300 – 1500°C | ◆ Diameter of 260 – 980 nm<br>◆ Microwave absorption- |
| Method 2 | HfC fibers | ◆ Electrospinning<br>◆ Precursor: hafnium (IV) tert-butoxide<br>◆ Pyrolyzation temperature of 1600°C | ◆ Diameter of 340 nm<br>◆ Ultrahigh temperature applications |
| Method 3 | HfC-coated carbon fibers | ◆ Thermal treatment carbon fibers and hafnium powders using furnace<br>◆ Carbon fiber (3 cm in length, ~30 μm in diameter): hafnium powder ratio of 2: 1 | ◆ Diameter of 60 μm<br>◆ High temperature applications |
| Method 4 | Cf/HfC and Cf/HfC-SiC | ◆ Precursor infiltration and pyrolysis<br>◆ Precursor: hafnium (IV) tetrachloride<br>◆ Carbon fiber diameter of 6.8 ± 0.3 μm | ◆ Aerospace structural application |
| Subject method | HfC-decorated C-nanofibers | ◆ Directly adding HfC into electrospun polymer solution without precursor<br>◆ Polymer: HfC ratio as high as 1:1 | ◆ Diameter of 100 – 200 nm<br>◆ Reinforce filler materials for jointing<br>◆ High toughness composited ultrahigh-temperature ceramics (UHTC)<br>◆ Yarn diameter of 50 – 200 μm |

Notes: HfC – hafnium carbide; SiC – silicon carbide; Cf – carbon fiber.

FIG. 17

METHOD FOR FABRICATING A HYBRID CARBON NANOFIBER PRODUCT

GOVERNMENT SUPPORT

This invention was made with government support under DE-NA0003865 awarded by the Department of Energy. The government has certain rights in the invention.

BACKGROUND

Carbon/carbon (C/C) and C/silicon carbide (SiC) fibers are materials of choice for ceramics due to their lightweight nature, mechanical properties, and thermal shock resistance. However, C is susceptible to oxidation above 400° C. in various environments and has poor stability in erosive environments. The addition of SiC improves the stability of C but only up to 1100° C. due to the volatile nature of $SiO_2$ at higher temperatures. Due to the thermal limitations of C/C and C/SiC handicapping ultra-high temperature performance, these materials cannot be used for ultra-high temperature applications.

BRIEF SUMMARY

Embodiments of the subject invention provide novel and advantageous carbon nanofiber (Cnf) products (e.g., mats, yarns, webs, etc.) and methods of fabricating the same. The Cnf products are flexible, are lightweight, and have high thermal conductivity. The Cnf products can be easily formable in a desired configuration (e.g., by winding, weaving, and/or wrapping) for applications including but not limited to a thermal protection system (TPS), high-performance brake materials (e.g., for high-speed trains, cars, and/or elevators), and electrode materials (e.g., for a cathode) for batteries (e.g., an ion battery). The Cnf products can be dispersed or "decorated" with other materials (e.g., ultra-high temperature ceramics (UHTCs) (for example, hafnium carbide (HfC)), such as UHTC nanoparticles) to give a hybrid nanofiber product (e.g., a hybrid Cnf product). An electrospinning process can be used to fabricate the hybrid Cnf products and can include preparation of an electrospinning solution, electrospinning, and carbonization (e.g., under a vacuum condition).

In an embodiment, a method for fabricating a hybrid Cnf product decorated with particles can comprise: performing an electrospinning process on an electrospinning solution to give an intermediate product, the electrospinning solution comprising an organic compound and the particles; and performing a carbonization process on the intermediate product to give the Cnf product decorated with the particles. The method can further comprise preparing the electrospinning solution before performing the electrospinning process, and the preparing of the electrospinning solution can comprise: dissolving the organic compound in a solvent to give a first intermediate solution; adding the particles to the first intermediate solution to give a second intermediate solution; and ultra-sonicating the second intermediate solution for a predetermined time to give the electrospinning solution. The organic compound can be an organic polymer. The particles can be nanoparticles and/or UHTC particles (e.g., UHTC nanoparticles, such as hafnium carbide (HfC) nanoparticles). The carbonization process can be performed under a vacuum condition. The carbonization process can comprise: disposing the intermediate product on a surface of a predetermined shape (e.g., a cuboid); and performing an initial heating stage on the intermediate product on the surface at a first predetermined temperature for a first predetermined time, a plurality of intermediate heating stages on the intermediate product on the surface at respective predetermined temperatures for respective predetermined times, and a cooling stage on the intermediate product on the surface to cool the intermediate product from the predetermined temperature of a last stage of the plurality of intermediate heating stages to an ambient temperature. The initial heating stage, the plurality of intermediate heating stages, the cooling stage, and/or the disposing of the intermediate product on the surface of the predetermined shape can be performed under the vacuum condition. The plurality of intermediate heating stages can comprise at least four intermediate stages (e.g., five intermediate stages); the first predetermined temperature can be in a range of, for example, from 200° C. to 250° C. (or about 200° C. to about 250° C. (e.g., 220° C. or about 220° C.)); each respective predetermined temperature of the plurality of intermediate heating stages can be in a range of, for example, from about 220° C. to about 800° C. (or from about 220° C. to 800° C. or from 220° C. to 800° C.). The predetermined temperature of the last stage of the plurality of intermediate heating stages can be, for example, 800° C. or about 800° C. The predetermined temperature of the second-to-last stage of the plurality of intermediate heating stages can be, for example, 800° C. or about 800° C. The predetermined temperature of all stages of the plurality of intermediate heating stages except for the last stage and the second-to-last stage thereof can be in a range of, for example, 200° C. to 280° C. (or about 200° C. to about 280° C., or 220° C. to 270° C. or about 220° C. to about 270° C.). The hybrid Cnf product can be, for example, a hybrid Cnf mat. The method can be performed without the use of any precursor (e.g., a compound that participates in a chemical reaction that produces the particles (e.g., UHTC nanoparticles)).

In another embodiment, a hybrid Cnf product can comprise: a plurality of carbon nanofibers; and a plurality of particles dispersed or decorated throughout the plurality of carbon nanofibers. The hybrid Cnf product can be flexible (i.e., able to be bent more than 90° without breaking and returned to the original position without breaking). The hybrid Cnf product can have a high thermal conductivity of at least 1 Watt per meter per Kelvin (W/m-K) at all temperatures in a range of from 100° C. to 800° C. (or at all temperatures of 100° C. or greater). The particles can be nanoparticles and/or UHTC particles (e.g., UHTC nanoparticles, such as HfC nanoparticles). The hybrid Cnf product can be, for example, a hybrid Cnf mat.

In a further embodiment, a device can comprise the hybrid Cnf product, and the can be, for example, a thermal protection system (TPS), a high-performance brake (e.g., for high-speed trains, cars, and/or elevators), or a battery (e.g., the hybrid Cnf product can be an electrode material (e.g., for a cathode)) for the battery (e.g., an ion battery).

BRIEF DESCRIPTION OF DRAWINGS

FIG. 17 shows a table comparing products and properties of fabrication methods of embodiments of the subject invention (labeled "Subject method") to existing fabrication methods. The row labeled "Method 1" is for the method from Hou et al. (ACS applied materials & interfaces, 10, 29876, 2018; which is hereby incorporated by reference herein in its entirety). The row labeled "Method 2" is for the method from Lee, Caraballa, Bregman, Bell et al. (Advances in Materials Science and Engineering 2021, 2021; which is hereby incorporated by reference herein in its entirety). The row labeled "Method 3" is for the method from Zhu, Li, Dong, Ma, Han, Cong et al. (Carbon 2017, 115, 640; which is hereby incorporated by reference herein in its entirety). The row labeled "Method 4" is for the method from Patra et al. (Journal of the European Ceramic Society, 38, 2297, 2018; which is hereby incorporated by reference herein in its entirety). It is noted that, for Method 4, the pyrolyzation temperature was 1500° C. and the sintering temperature was 2200° C.

DETAILED DESCRIPTION

Embodiments of the subject invention provide novel and advantageous carbon nanofiber (Cnf) products (e.g., mats, yarns, webs, etc.) and methods of fabricating the same. The Cnf products are flexible, are lightweight, and have high thermal conductivity. The Cnf products can be easily formable in a desired configuration (e.g., by winding, weaving, and/or wrapping) for applications including but not limited to a thermal protection system (TPS), high-performance brake materials (e.g., for high-speed trains, cars, and/or elevators), and electrode materials (e.g., for a cathode) for batteries (e.g., an ion battery). The Cnf products can be dispersed or "decorated" with other materials (e.g., ultra-high temperature ceramics (UHTCs) (for example, hafnium carbide (HfC)), such as UHTC nanoparticles) to give a hybrid nanofiber product (e.g., a hybrid Cnf product). An electrospinning process can be used to fabricate the hybrid Cnf products and can include preparation of an electrospinning solution, electrospinning, and carbonization (e.g., under a vacuum condition).

Figures 1A, 1B:
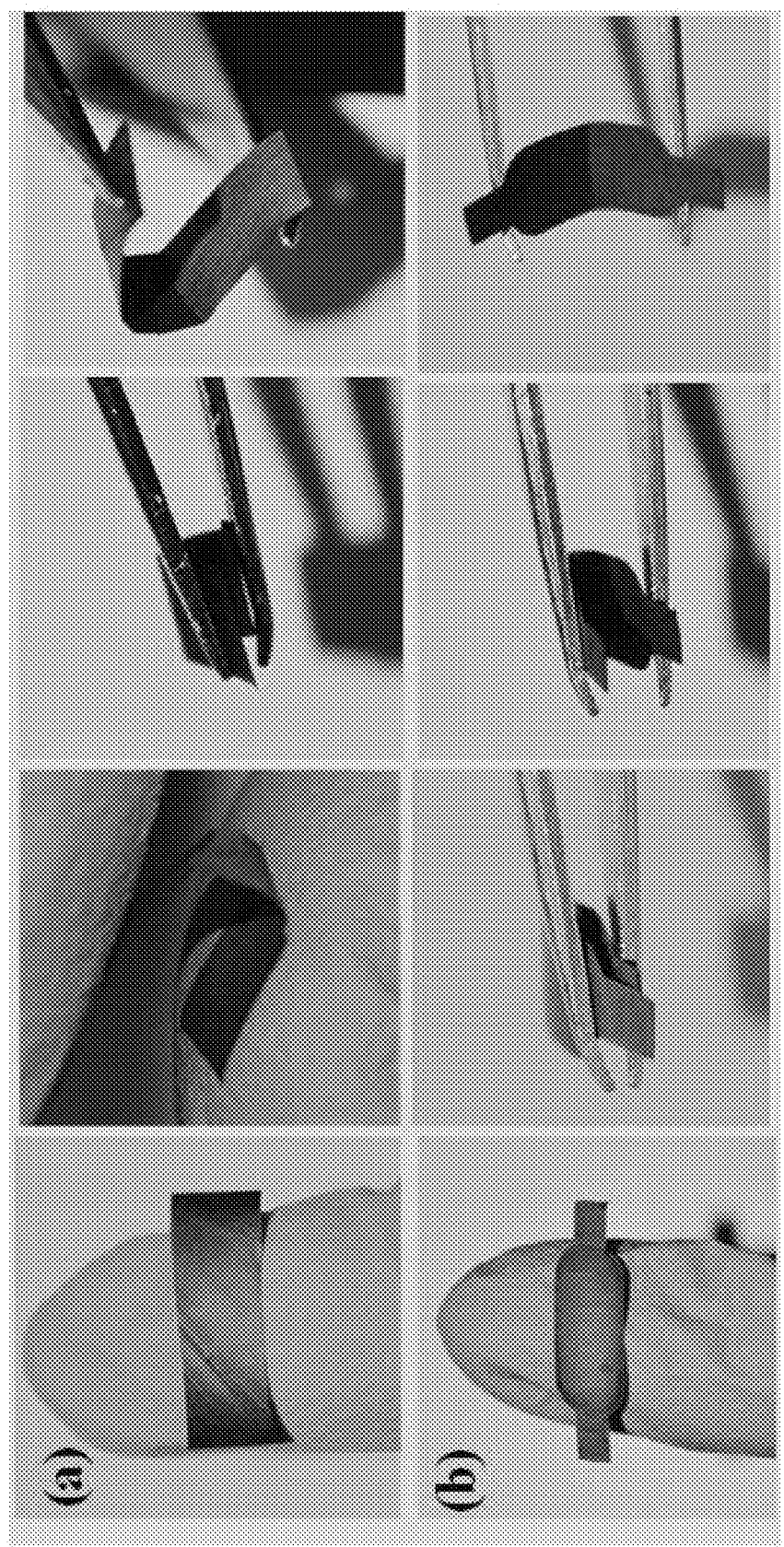
FIG. 1(a) shows four images of an electrospun carbon nanofiber (Cnf) mat, according to an embodiment of the subject invention.
FIG. 1(b) shows four images of an electrospun carbon nanofiber (Cnf) mat decorated with hafnium carbide (HfC), according to an embodiment of the subject invention.

Embodiments of the subject invention make it possible to develop any kind of hybrid nanofiber products, which are not restricted just to HfC-based UHTCs. The fabrication process leads to products that are unique in showing off the highly flexible nature of ultra-hard UHTCs, which otherwise can't be highlighted by any other fabrication route (other than electrospinning). The fabrication process highlights the formability of ceramics (e.g., UHTCs) into the desired configuration mandrel to thermally protect any structural components. Additional flexibility is of great advantage because it can allow for the possibility to be applied on protecting uneven surfaces or flexible devices, as seen with the HfC-decorated Cnf (HfC-Cnf) mat shown in FIG. 1(b) and even the Cnf mat shown in FIG. 1(a).

As discussed in the Background, carbon/carbon (C/C) and C/silicon carbide (SiC) (C/SiC) fibers are materials of choice for ceramics due to their lightweight nature, mechanical properties, and thermal shock resistance. However, C is susceptible to oxidation above 400° C. in various environments and has poor stability in erosive environments. While the addition of SiC (i.e., C/SiC) improves the stability, it only does so up to 1100° C. due to the volatile nature of $SiO_2$ at higher temperatures. Due to the thermal limitations of C/C and C/SiC handicapping ultra-high temperature performance, incorporation of UHTCs could be a viable replacement. UHTCs are known for an intriguing combination of metal-like and ceramic-like properties that offer excellent stability at temperatures greater than 2000° C. HfC has an extremely high melting temperature (about 3900° C.) and is a potential material for a TPS. Also, UHTCs intrinsically have very high lattice thermal conductivity, which can prevent or inhibit thermal damages by effectively dissipating the heat in the environment (owing to high thermal conductivity, such as in the HfC-Cnf of embodiments of the subject invention).

UHTC research has been primarily focused on obtaining dense UHTCs, but embodiments of the subject invention allow for innovative applications because flexible, ultra-light, and thermally conductive UHTC-decorated Cnf products (i.e., Cnf products with UHTCs dispersed therein or bonded therewith) can be fabricated. The high density of UHTCs is therefore no longer a limitation for designing structural components for commercial space applications. Embodiments of the subject invention offer an attractive combination of properties including enhanced flexibility, low overall weight, and high thermal conductivity, while solving related art concerns related to the durability of UHTCs, which can provide an improved TPS for various components in commercial space applications.

Related art methods for attempting to develop HfC-based fibers use precursor infiltration and pyrolysis, thermal surface coating, and other methods utilizing a precursor. All of these either require a high pyrolysis temperature of 1300° C. to 1600° C. or carbon micro-fibers coated with HfC nanoparticles. Other methods utilizing a precursor give rise to apparent defects such as voids and pores beneath the surfaces of the fibers, as well as at the surfaces of fibers, due to the thermal decomposition of precursors. This degrades the flexibility, mechanical properties, and thermal properties of the fabricated fibers. In contrast, the HfC-Cnf of embodiments of the subject invention, which can have a diameter of, for example, 100 nanometers (nm) to 200 nm, has pores and voids filled with HfC particles (e.g., nanoparticles) and has enhanced flexibility.

Embodiments of the subject invention provide methods of fabricating a Cnf product dispersed or "decorated" with particles (e.g., nanoparticles such as HfC nanoparticles). These hybrid Cnf products (e.g., HfC-Cnf) provide enhanced flexibility (see, e.g., FIG. 1(b)), enhanced thermal conductivity (see, e.g., FIG. 7), a good filler material for joining UHTCs (see, e.g., FIGS. 8 and 9), the ability to produce a multi-layered sandwiched structure of UHTCs with improved mechanical strength (see, e.g., FIGS. 11-13), and sandwiched structure in UHTCs with improved mechanical strength (see FIGS. 11-13), and an improved multi-layered structure fabrication ability compared to a carbon fiber (Cf) (see, e.g., FIG. 16). The fabrication methods are applicable to all classes of high temperature advanced structural ceramics, including but necessarily limited to UHTCs and high-entropy UHTCs (RE-UHTCs).

Embodiments of the subject invention provide ultra-light, highly flexible, easily formable, and thermally conductive hybrid Cnf products (e.g., HfC-Cnf) that can be used, for example, as a TPS in commercial space applications. The Cnf mats can also be used as ultra-thin filler material for joining similar/dissimilar UHTCs and/or any other structural ceramics. The joint is even stronger than two joined UHTCs while maintaining similar chemistry at the interface. The fabrication method is simple, fast, inexpensive, repeatable, and can easily be applied to any class of high temperature structural materials including UHTCs and multi-component UHTCs at a large scale. The fabricated product (e.g., HfC-Cnf) can be used for many applications, including thermal insulation systems, filler material for joining, and multi-layered composites for enhanced toughness.

Figure 18A:
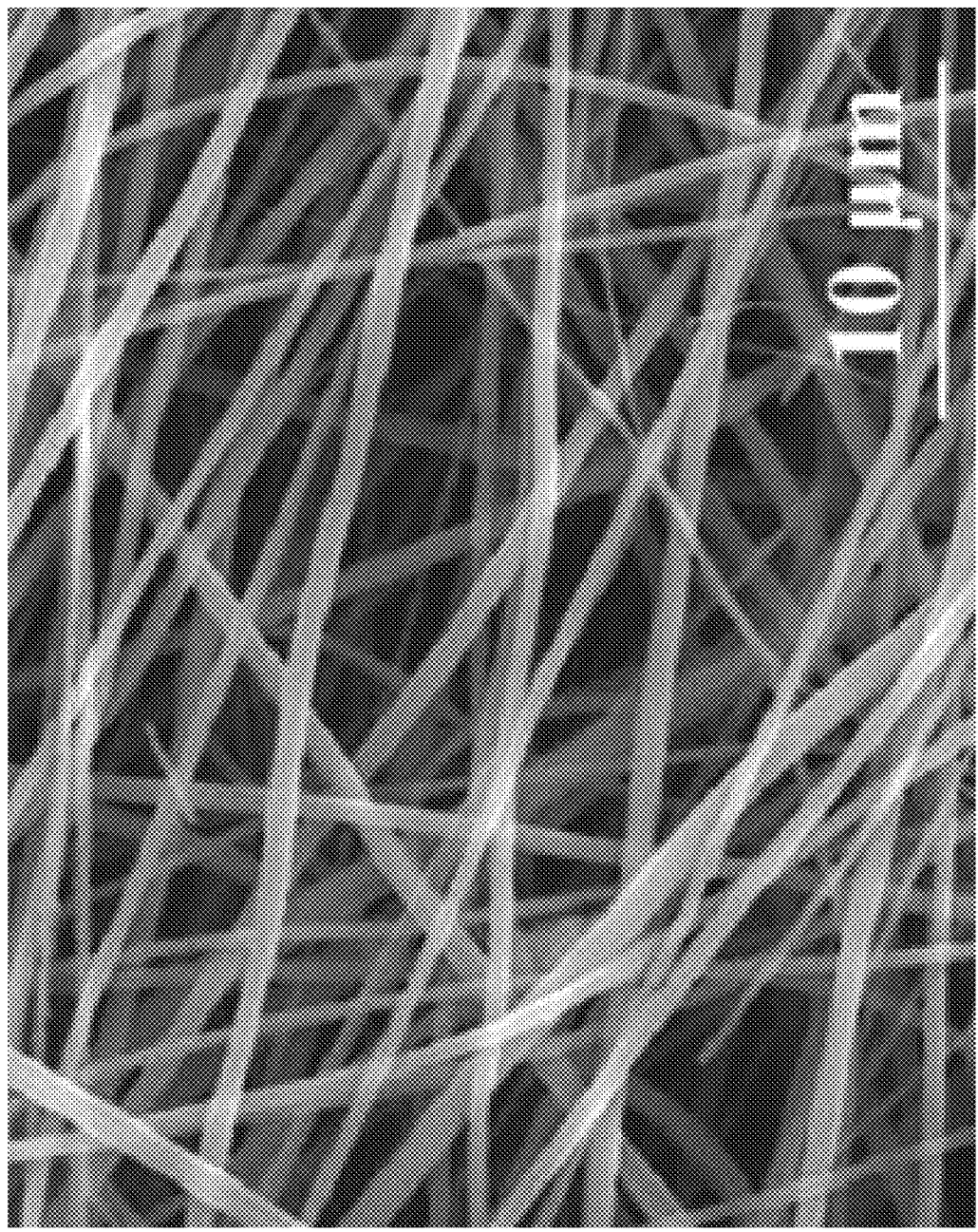
FIG. 18(a) shows an SEM image of HfC/silicon carbide (SiC) nanofiber mats from Method 1 referenced in FIG. 17. The scale bar is 10 μm.
Figure 18B:
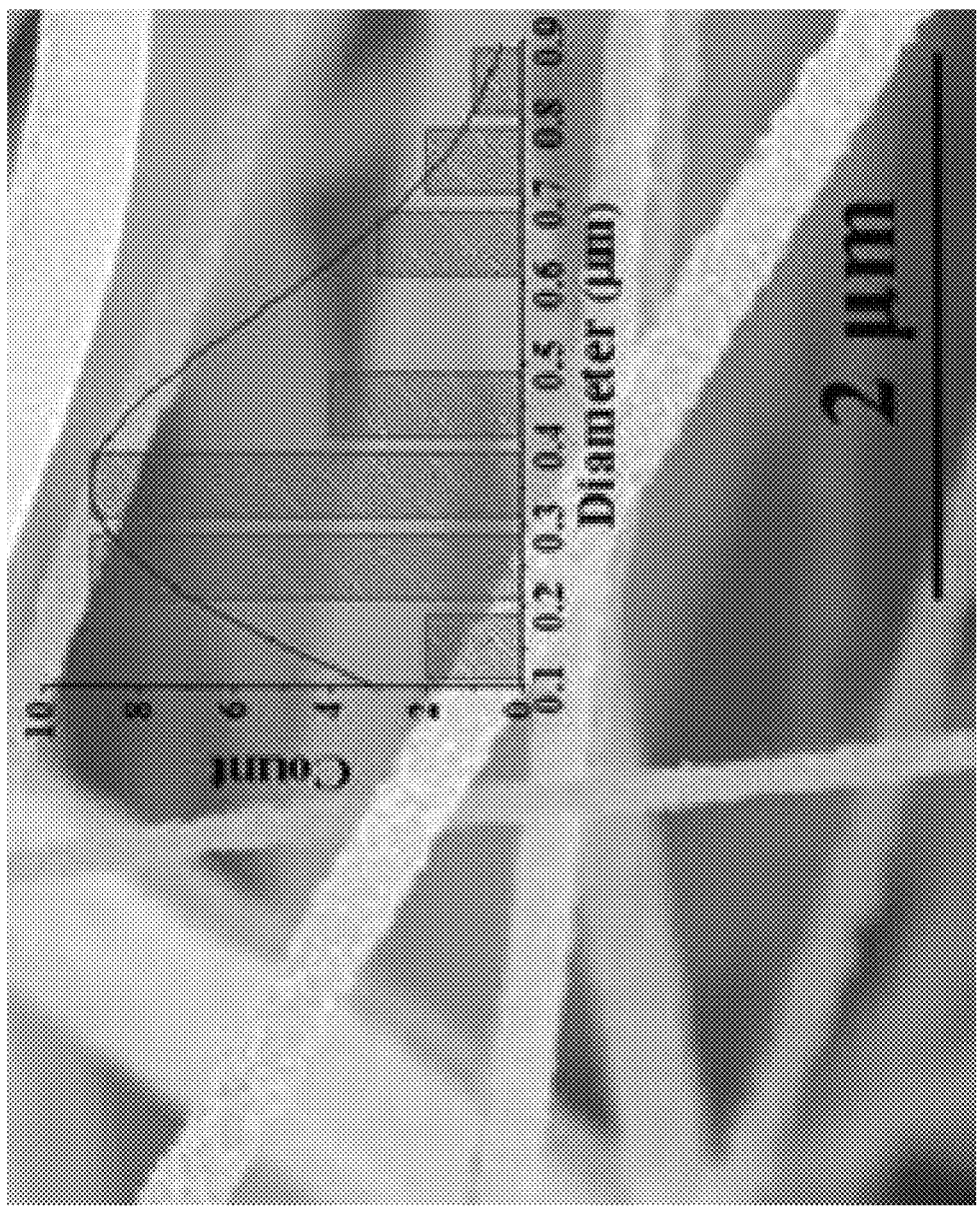
FIG. 18(b) shows an SEM image of HfC/SiC nanofiber mats from Method 1 referenced in FIG. 17. The scale bar is 2 μm. The inset shows a plot of count versus diameter (in μm).
Figure 19A:
FIG. 19(a) shows an SEM image of HfC fibers from Method 2 referenced in FIG. 17. The scale bar is 500 μm.
Figure 19B:
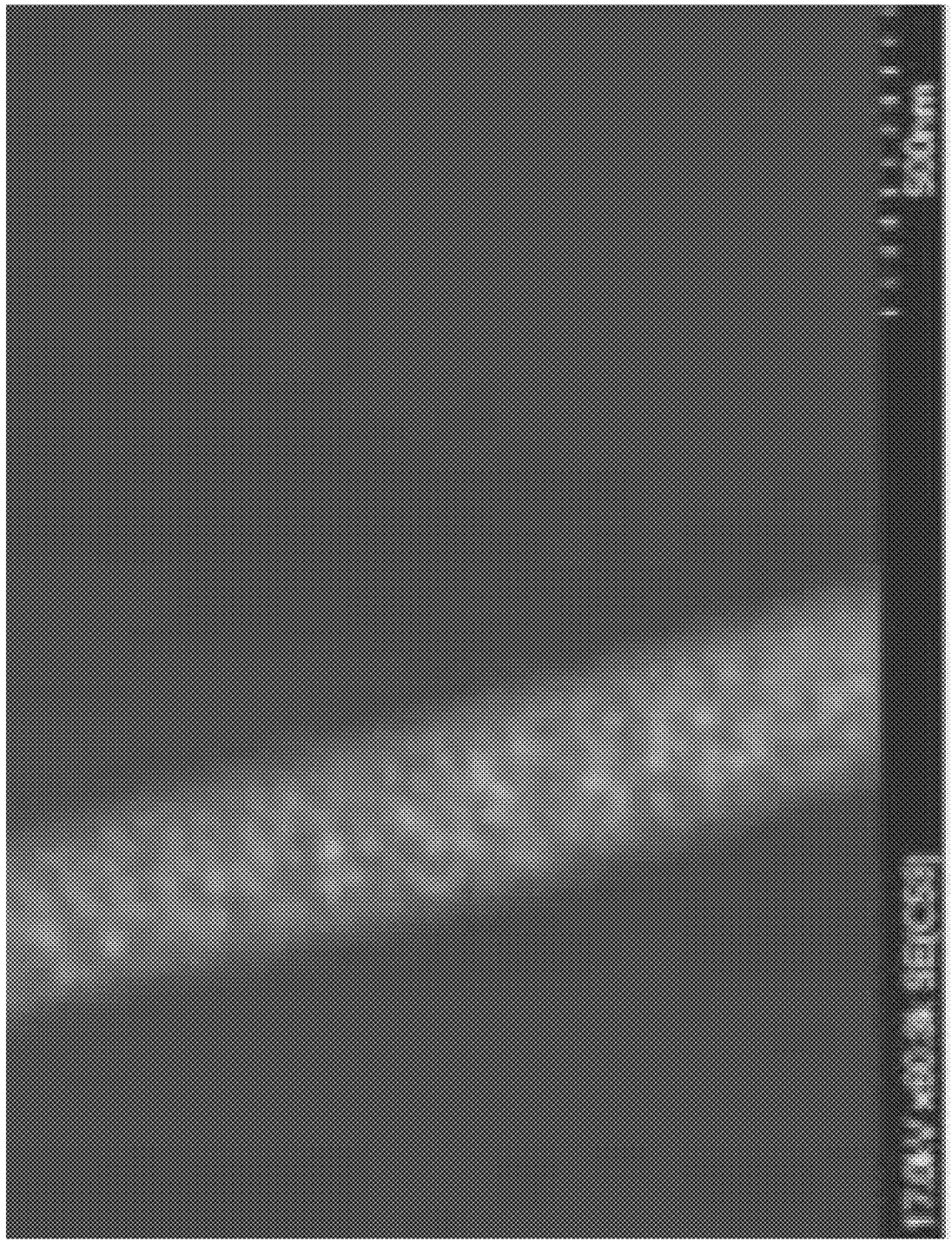
FIG. 19(b) shows an SEM image of HfC fibers from Method 2 referenced in FIG. 17. The scale bar is 500 μm.
Figures 20A, 20B:
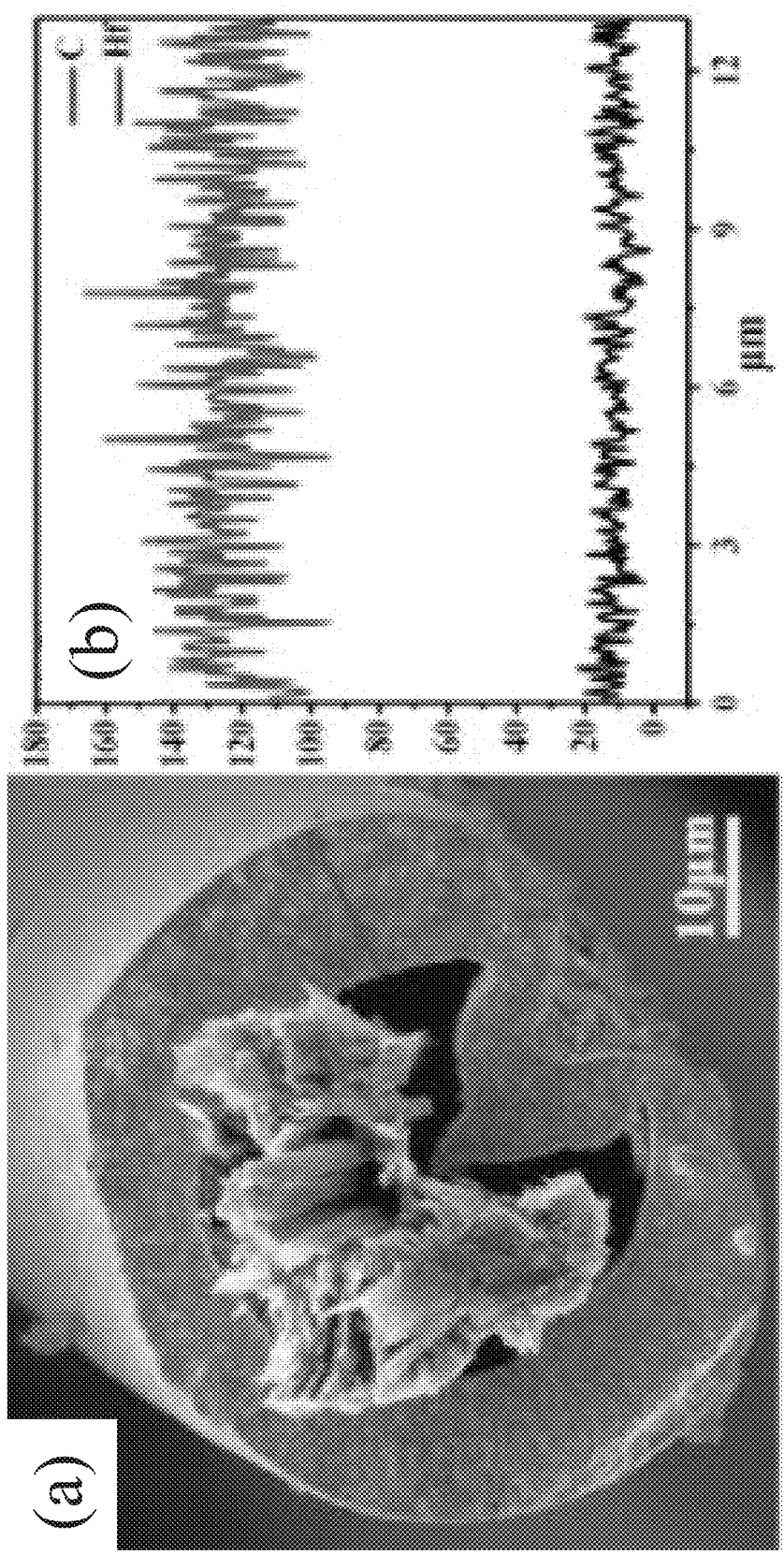
FIG. 20(a) shows an SEM image of HfC-coated carbon fibers from Method 3 referenced in FIG. 17. The scale bar is 10 μm.
FIG. 20(b) shows an EDS line plot of count versus diameter (in μm) for HfC-coated carbon fibers from Method 3 referenced in FIG. 17. The curve located high in the plot is for Hf, and the curve located low in the plot is for C.
Figures 21A, 21B:
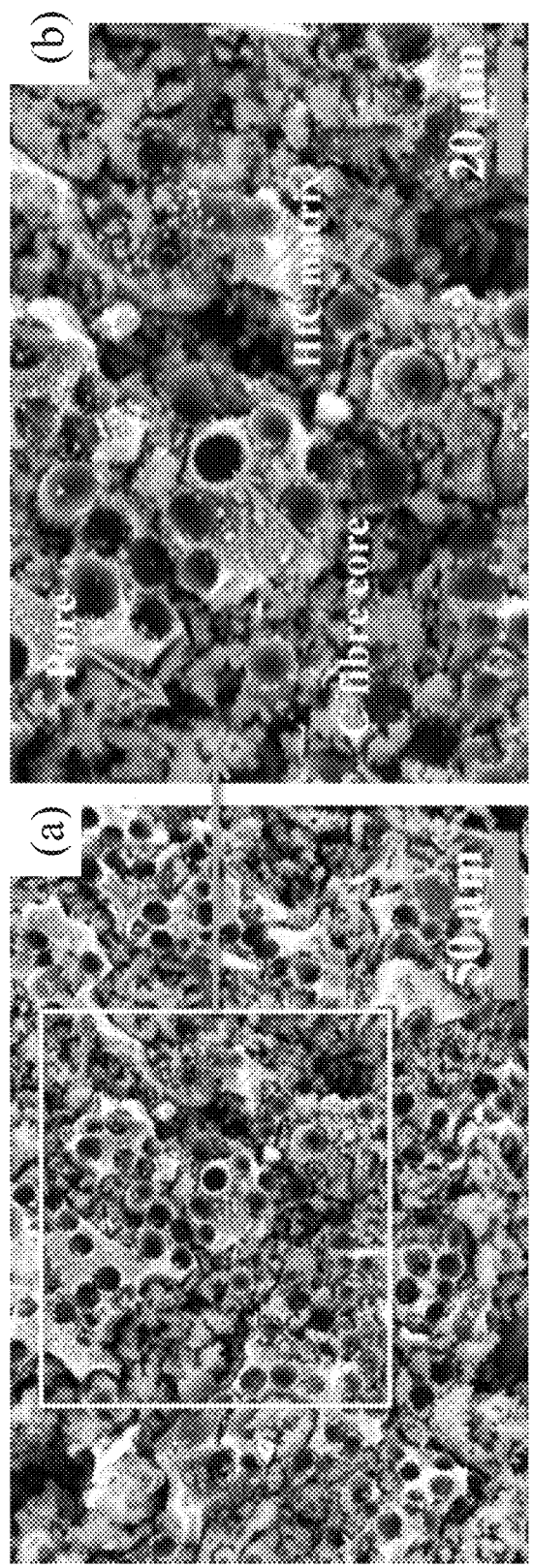
FIG. 21(a) shows an SEM image of Cf with HfC and Cf with HfC-SiC from Method 4 referenced in FIG. 17. The scale bar is 50 μm.
FIG. 21(b) shows an SEM image of Cf with HfC and Cf with HfC-SiC from Method 4 referenced in FIG. 17. The scale bar is 20 μm.
Figure 22A:
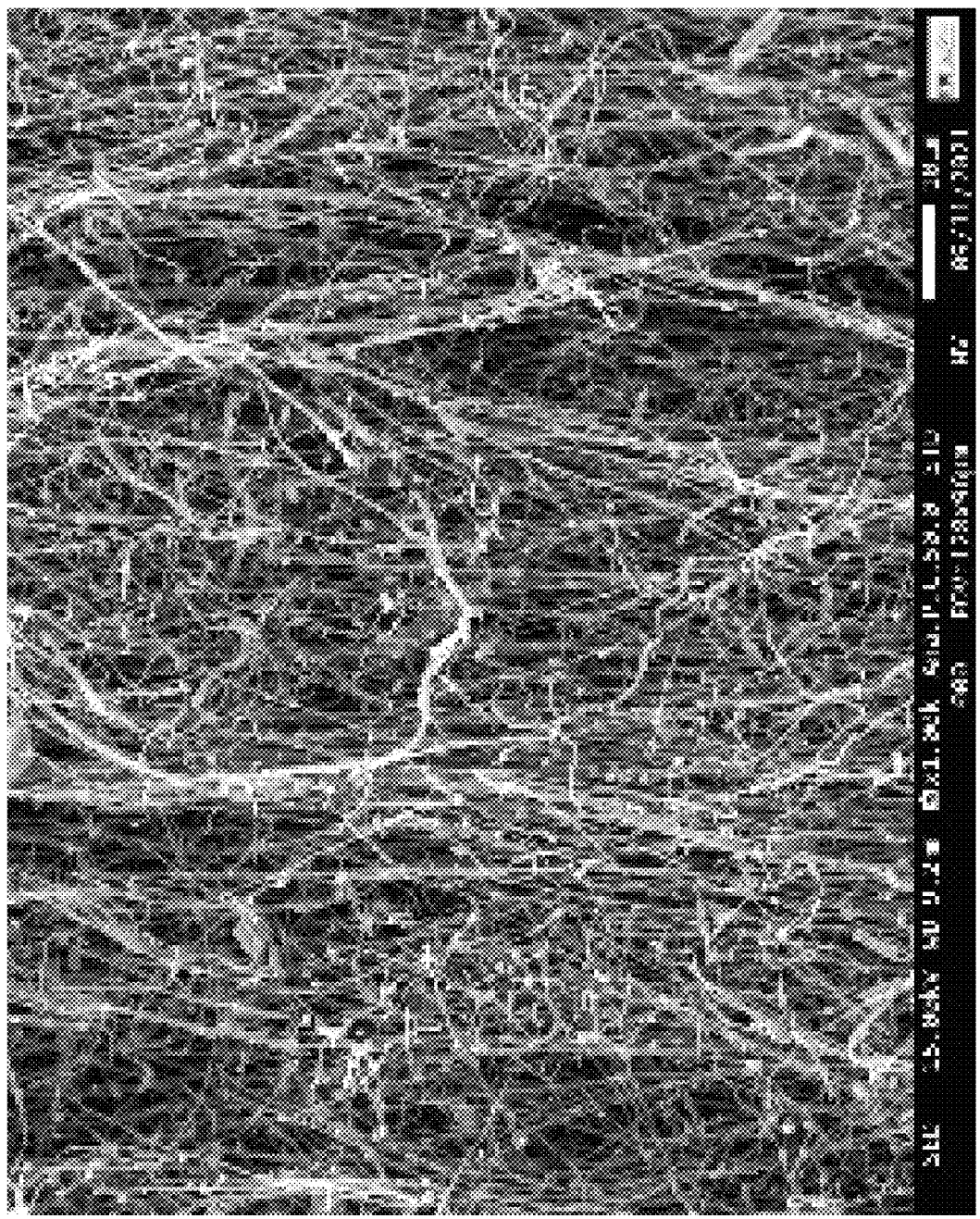
FIGS. 22(a)-22(d) show SEM images of an HfC-Cnf mat, according to an embodiment of the subject invention ("Subject method" in FIG. 17). The scale bar in FIG. 22(a) is 10 μm; the scale bar in FIG. 22(b) is 1 μm; the scale bar in FIG. 22(c) is 100 μm; and the scale bar in FIG. 22(d) is 100 μm.
Figure 22B:
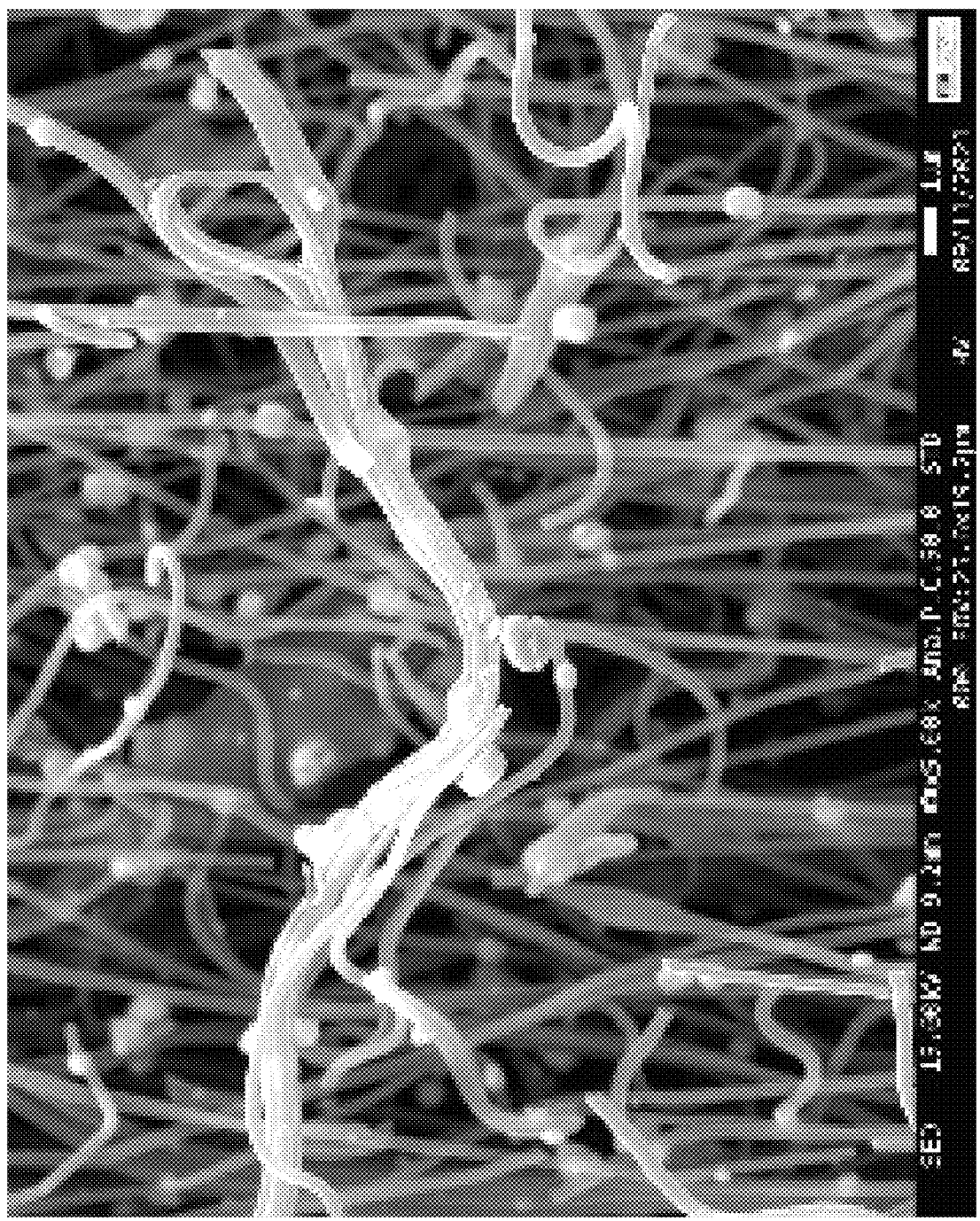
Figure 22C:
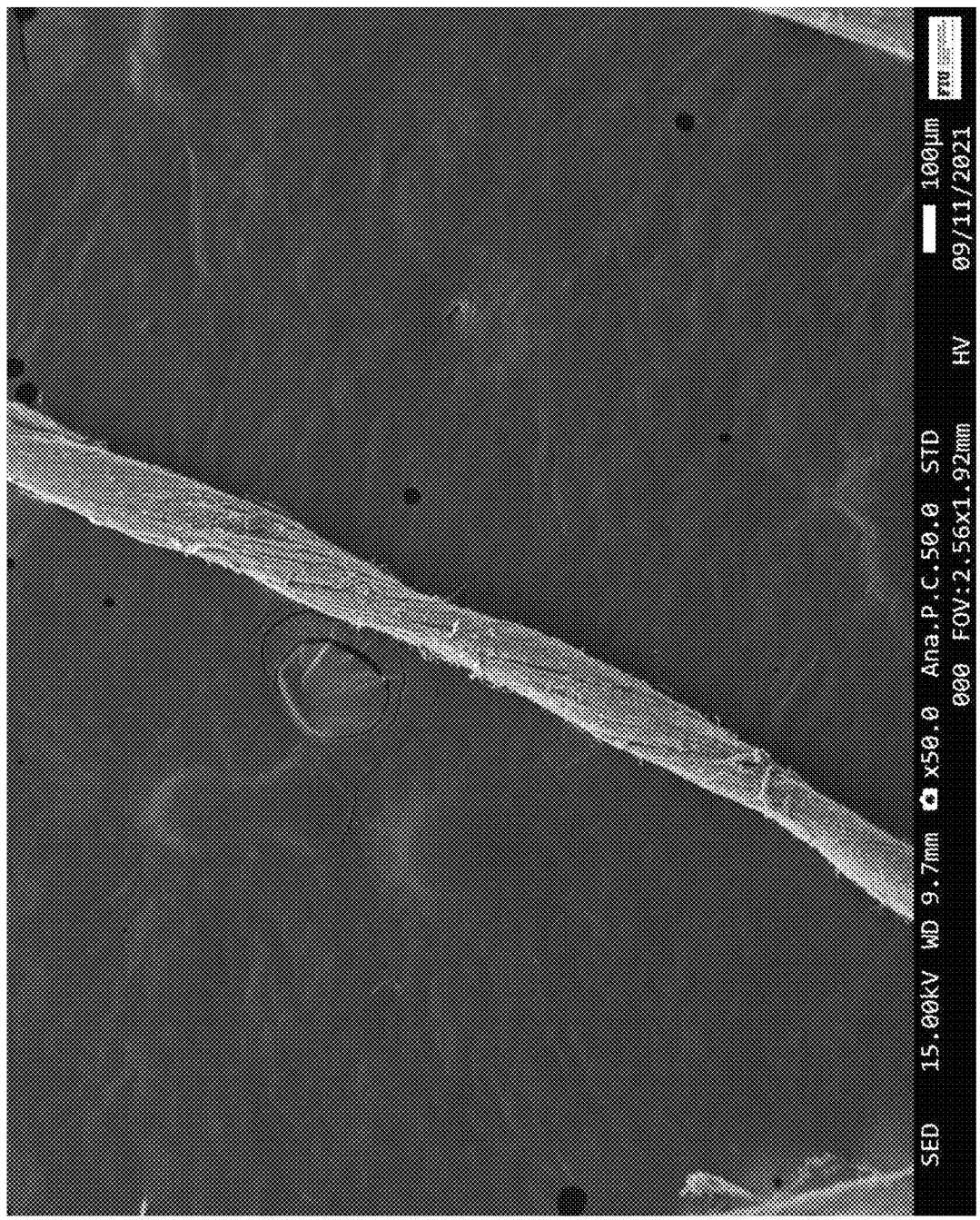
Figure 22D:
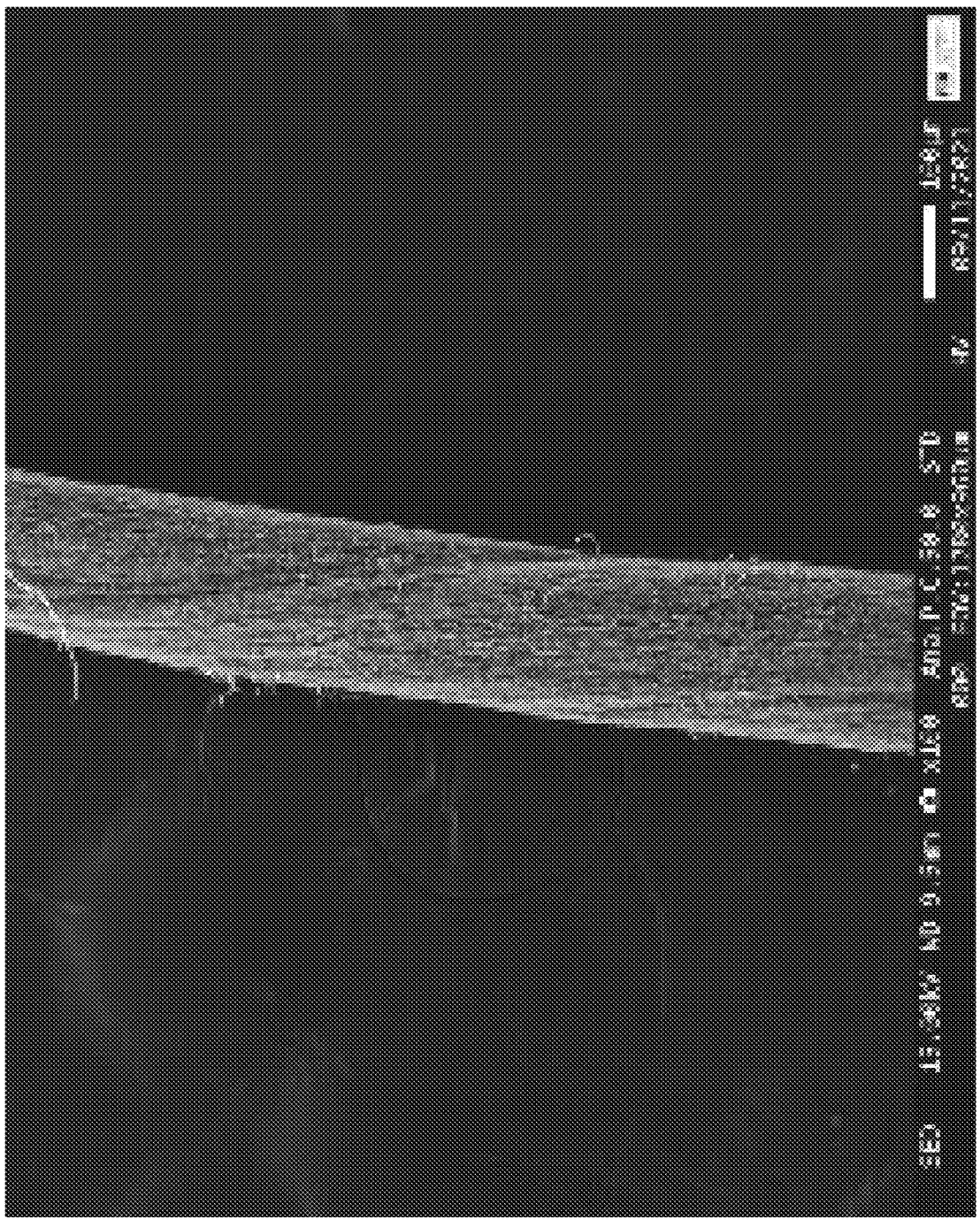

FIG. 17 shows a table comparing products and properties of fabrication methods of embodiments of the subject invention (labeled "Subject method") to existing fabrication methods. The rows labeled "Method 1", "Method 2", "Method 3", and "Method 4" are for the methods described in Hou et al., Lee et al., Zhu et al., and Patra et al., respectively (see also the description in the Brief Description of Drawings herein). FIGS. 18($a$)-18($b$) show SEM images of HfC/SiC nanofiber mats from Method 1; FIGS. 19($a$)-19($b$) show SEM images of HfC fibers from Method 2; FIGS. 20($a$)-20($b$) show an SEM image and a plot of count versus diameter, respectively, of HfC-coated carbon fibers from Method 3; FIGS. 21($a$)-21($b$) show SEM images of Cf with HfC and Cf with HfC-SiC from Method 4; and FIGS. 22($a$)-22($d$) show SEM images of an HfC-Cnf mat according to an embodiment of the subject invention.

Figure 2A:
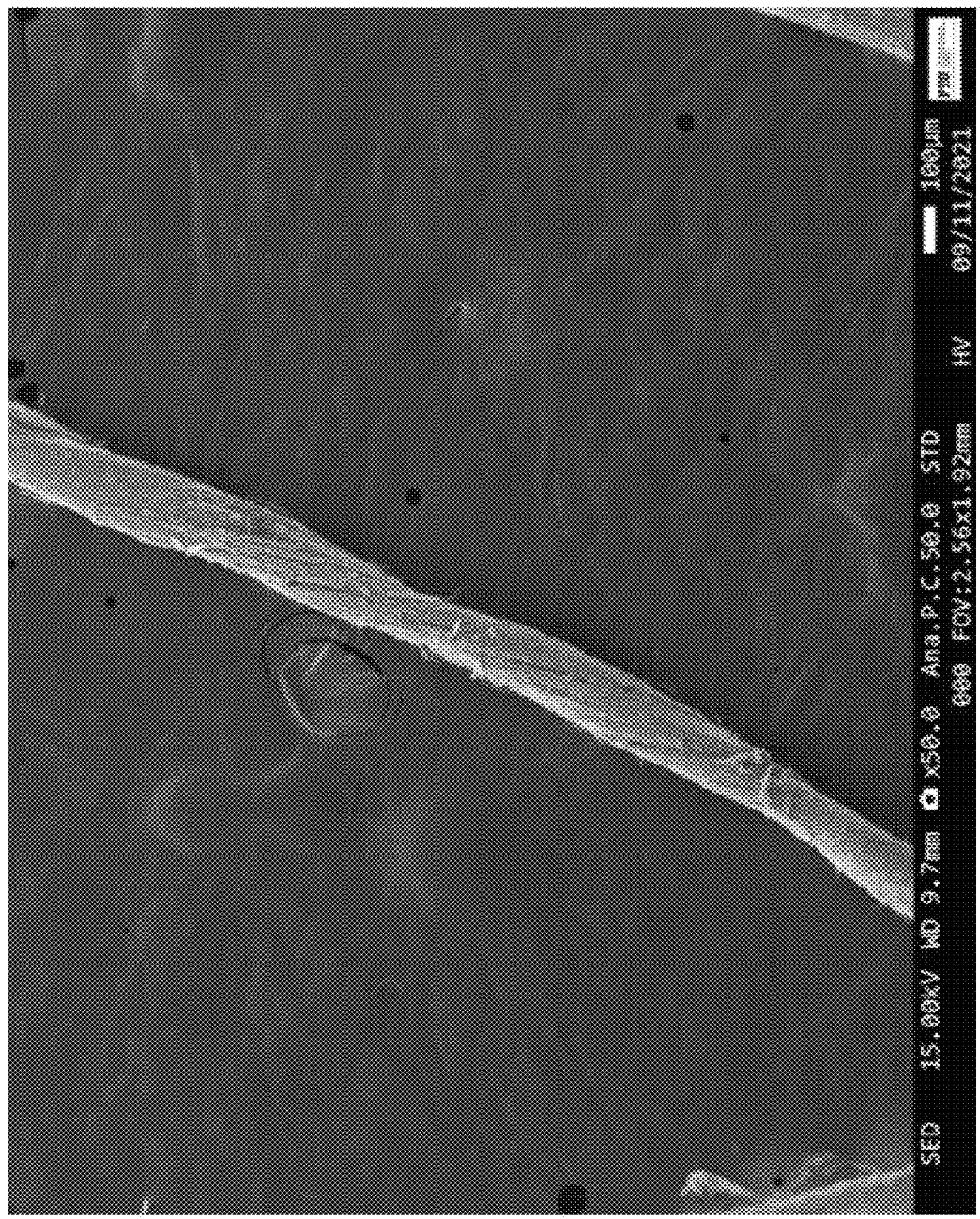
FIG. 2(a) shows a scanning electron microscope (SEM) image of a HfC-decorated carbon nanofiber (HfC-Cnf) yarn, according to an embodiment of the subject invention. The scale bar is 100 micrometers (μm).
Figure 2B:
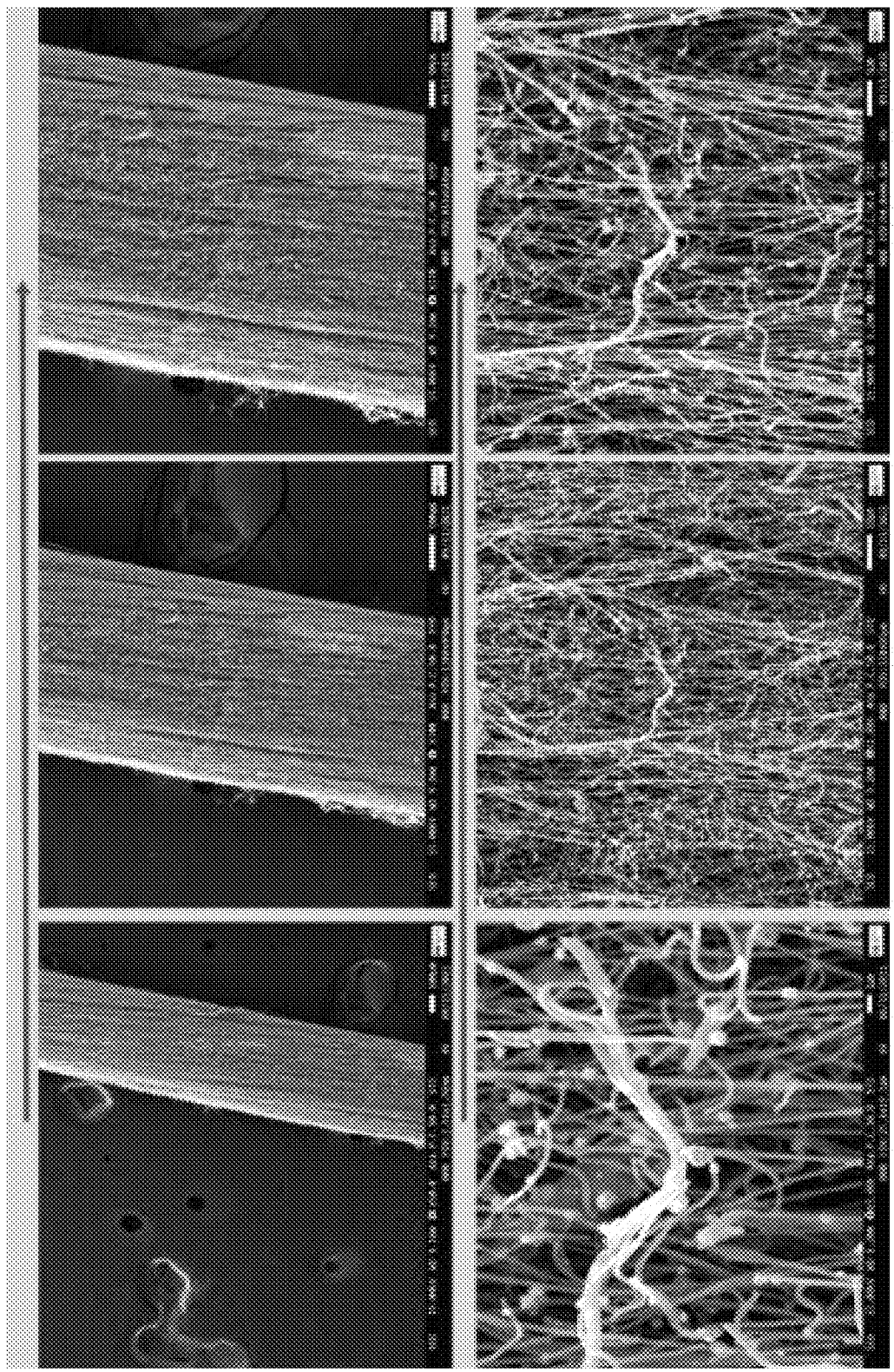
FIG. 2(b) shows six SEM images of HfC-Cnf yarns, according to an embodiment of the subject invention, at various magnification levels. The scale bars for the six images are 100 µm (top-left), 100 µm (top-middle), 50 µm (top-right), 1 µm (bottom-left), 10 µm (bottom-middle), and 5 µm (bottom-right).
Figure 2C:
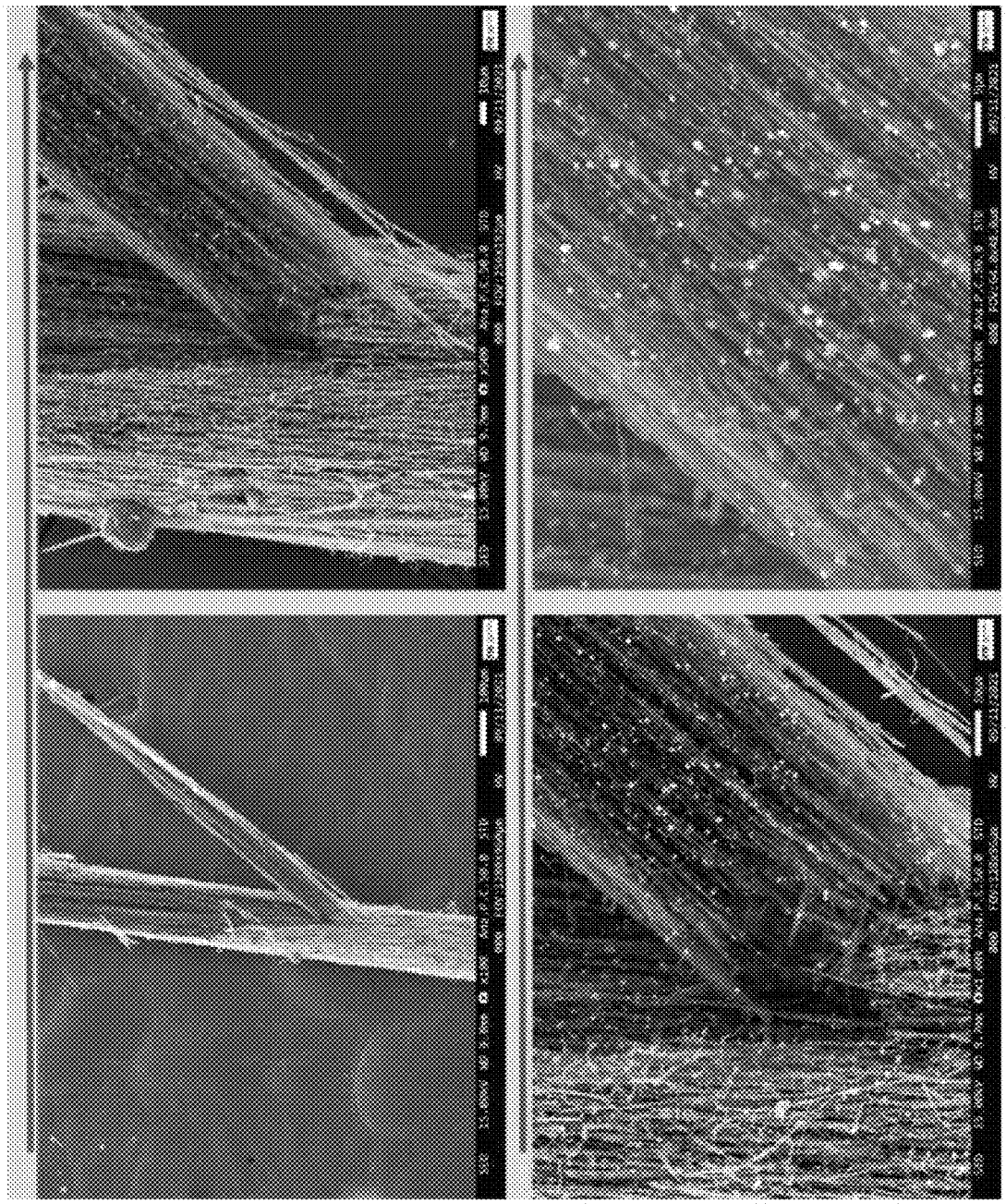
FIG. 2(c) shows four SEM images of the inside of HfC-Cnf yarns, according to an embodiment of the subject invention, at various magnification levels. The scale bars for the four images are 100 µm (top-left), 10 µm (top-right), 10 µm (bottom-left), and 5 µm (bottom-right).

Referring to FIGS. 17-22($d$), the embodiments of the subject invention (referred to as "subject method") have several advantages over the related art methods (Methods 1-4). Methods of embodiments of the subject invention do not utilize any precursor in the fabrication, which makes it a more straightforward and simpler route. Without a precursor, the highest carbonization temperature used in the subject method is 800° C., which is 500° C.-800° C. lower than that of Methods 1 and 2. There is also an absence of any secondary intermediate or residual phases present in the final product in the subject method. In addition, HfC powders are uniformly embedded in and on the Cnf (see, e.g., the energy dispersive spectroscopy (EDS) maps in FIGS. 5($a$) and 5($b$)) in the products of the subject method, ensuring strong bonding between HfC and Cnf. In contrast, HfC powders are either coated on Cf surfaces or infiltrated within the matrix of Cf membranes for Methods 3 and 4, where HfC doesn't bond well with Cf; therefore, the true attribute of HfC powders cannot be employed under service conditions. HfC-Cnf of the subject method, with even such a high loading rate (up to 50 wt. %), can exhibit a diameter of 100 nm-200 nm (see, e.g., FIG. 4), which is lower than all of Methods 1-4. A lower diameter contributes to a higher surface area. The HfC-Cnf mats of the subject method provide enhanced flexibility, formability, and thermal conductivity (up to 20-fold; see, e.g., FIG. 7) as compared to Cnf (with no particles dispersed or decorated therein). Also, the subject method can fabricate HfC-Cnf based thin webs with a thickness of 50 micrometers (μm)-300 μm and yarns (see, e.g., FIGS. 2($a$)-2($c$)) with a diameter of 50 μm-200 μm; HfC-Cnf based yarns can be used in practical applications to weave thermal retardant suits. Moreover, the HfC-Cnf mats fabricated by the subject method can: be used as an efficient filler for joining UHTCs; provide enhanced toughness to the joint when integrated as a multi-layer UHTC; and be better reinforcement over commercially-available Cf.

In an embodiment, a fabrication process can include electrospinning an electrospinning solution and carbonization (e.g., under a vacuum condition) to provide a Cnf product (e.g., mat) dispersed or decorated with particles (e.g., nanoparticles, such as HfC nanoparticles). The electrospinning solution can include an organic compound (e.g., an organic polymer) and the particles dissolved in a solvent. The electrospinning step can produce an intermediate electrospun nanofiber product (e.g., web and/or yarn) dispersed with particles.

The carbonization step can include disposing (e.g., winding) one or more layers of the intermediate electrospun nanofiber product on a surface of a desired shape (e.g., a cuboid surface, though embodiments are not limited thereto) and then performing a stepwise carbonization of at least two stages (e.g., at least three stages, such as six or seven stages) each having a predetermined temperature and/or time. The predetermined temperature for each stage can be in a range of, for example, 150° C.-825° C. (or about 150° C.-about 825° C.), such as in a range of from 220° C.-800° C. (or about 220° C.-about 800° C.), and the predetermined time for each stage can be in a range of from, for example, 0.2 hours (h)-1.6 h (or about 0.2 h-about 1.6 h), such as in a range of from 0.3 h-1.5 h (or about 0.3 h to about 1.5 h). In some embodiments, the last stage can include cooling to room temperature (starting from the temperature of the second-to-last stage, which can be, e.g., 800° C. or about 800° C.). In some embodiments, the second-to-last stage and/or the third-to-last stage can have higher temperatures and/or longer times than preceding stages. The carbonization stages can be performed at very low pressure (e.g., less than 100 Pascal (Pa)), such as under vacuum conditions. The flexibility of Cnf remains intact even after adding ultra-hard dispersants (e.g., HfC ceramic) therein, as depicted in FIGS. 1($a$) and 1($b$). The hybrid Cnf product (e.g., HfC-Cnf) has excellent formability into yarns, as depicted in FIGS. 2($a$)-2($c$).

In some embodiments, the fabrication process can further include preparation of the electrospinning solution prior to the electrospinning step. A solution (e.g., a homogenous solution) of an organic compound (e.g., an organic polymer) with a solvent can be prepared. The particles (e.g., nanoparticles, such as UHTC nanoparticles (for example, HfC nanoparticles)) can be added to the solution. The solution can be sonicated (e.g., ultra-sonicated) for a predetermined time (e.g., 0.5 h-5 h, such as 3 h or about 3 h) for uniform (or substantially uniform) dispersion to give the electrospinning solution.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

An electrospinning solution (which can also be referred to as an electrospun solution) was prepared. A homogenous polyacrylonitrile (PAN) solution with 12 wt. % of N,N-dimethylformamide solvent was prepared. Thereafter, as-procured HfC (50 wt. %) nanoparticles were added to this solution, and the solution was ultra-sonicated for 3 hours for uniform dispersion to give the electrospinning solution.

In order to fabricate aligned HfC-decorated PAN nanofibers, the electrospinning solution was electrospun at a voltage in a range of from 13 kilovolts (kV)-15 kV, with a pumping speed of 1 milliliter per hour (ml/h)-2 ml/h, and a collector rotating speed of 1000 revolutions per minute (rpm)-1500 rpm. For a better comparison, a virgin PAN solution was also electrospun to obtain PAN nanofibers using the same parameters.

Next, a carbonization step was performed under vacuum conditions. A single layer of HfC decorated PAN nanofiber web/yarn was wound on a cuboid surface to ensure tension during carbonization to obtain the HfC-Cnf mat. The stepwise carbonization parameters were as follows: stage I (220° C., 0.39 hours (h)); stage II (220° C., 0.3 h); stage III (270° C., 0.5 h); stage IV (270° C., 0.3 h); stage V (800° C., 1.46 h); stage VI (800° C., 1 h); and stage VII (cooling to room temperature). PAN nanofibers were also pyrolyzed at the same parameters to obtain a Cnf mat (with no HfC nanoparticles).

Figure 3:
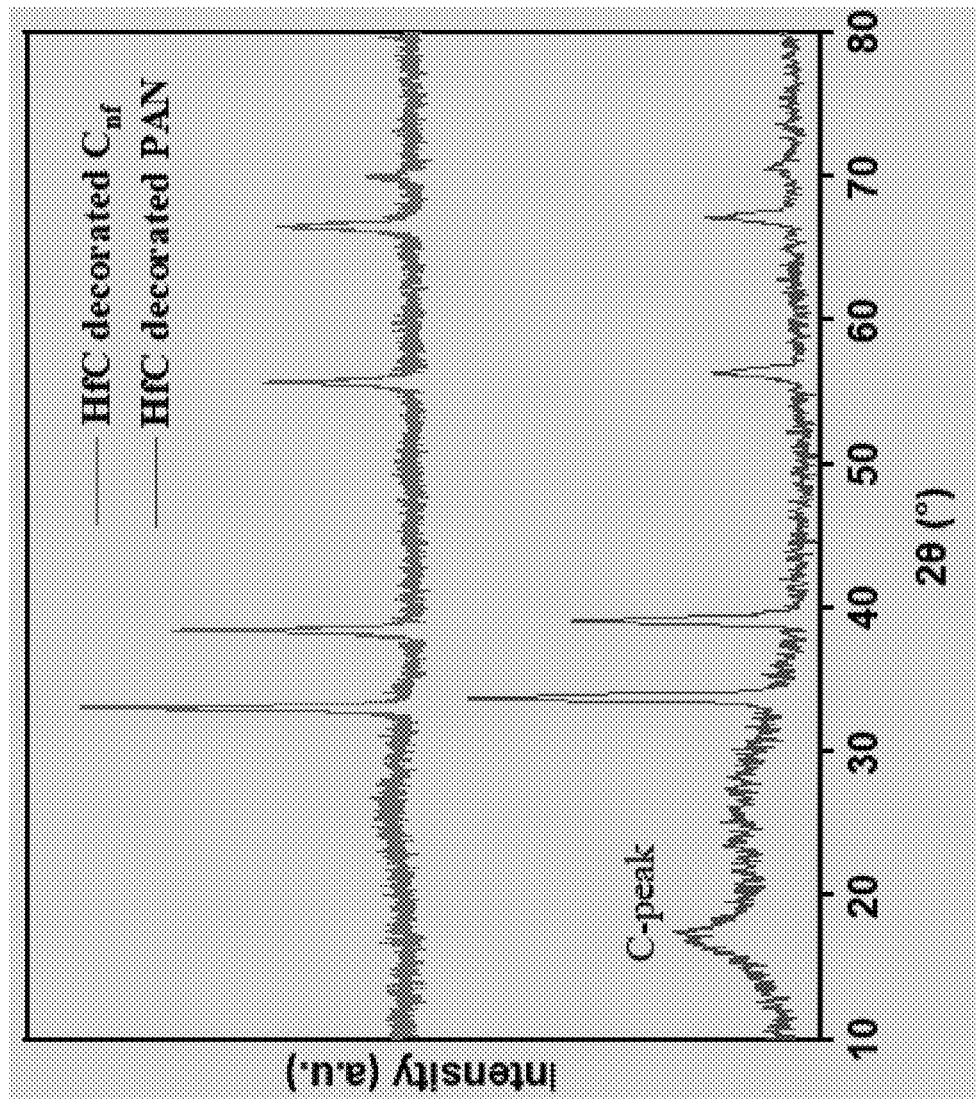
FIG. 3 shows a plot of intensity (in arbitrary units (a.u.)) versus 2θ (in degrees), showing the X-ray diffraction (XRD) pattern and HfC peaks in an electrospun HfC-polyacrylonitrile (PAN) fiber before and after pyrolysis. The curve with the lower intensity values is for HfC-decorated PAN (before pyrolysis); and the curve with the higher intensity values is for HfC-decorated Cnf (after pyrolysis).

FIG. 3 shows the X-ray diffraction (XRD) pattern showing HfC peaks in the electrospun HfC-polyacrylonitrile (PAN) fiber before and after pyrolysis. The XRD analysis before and after heat treatment confirms the presence of HfC.

Figures 4A, 4B:
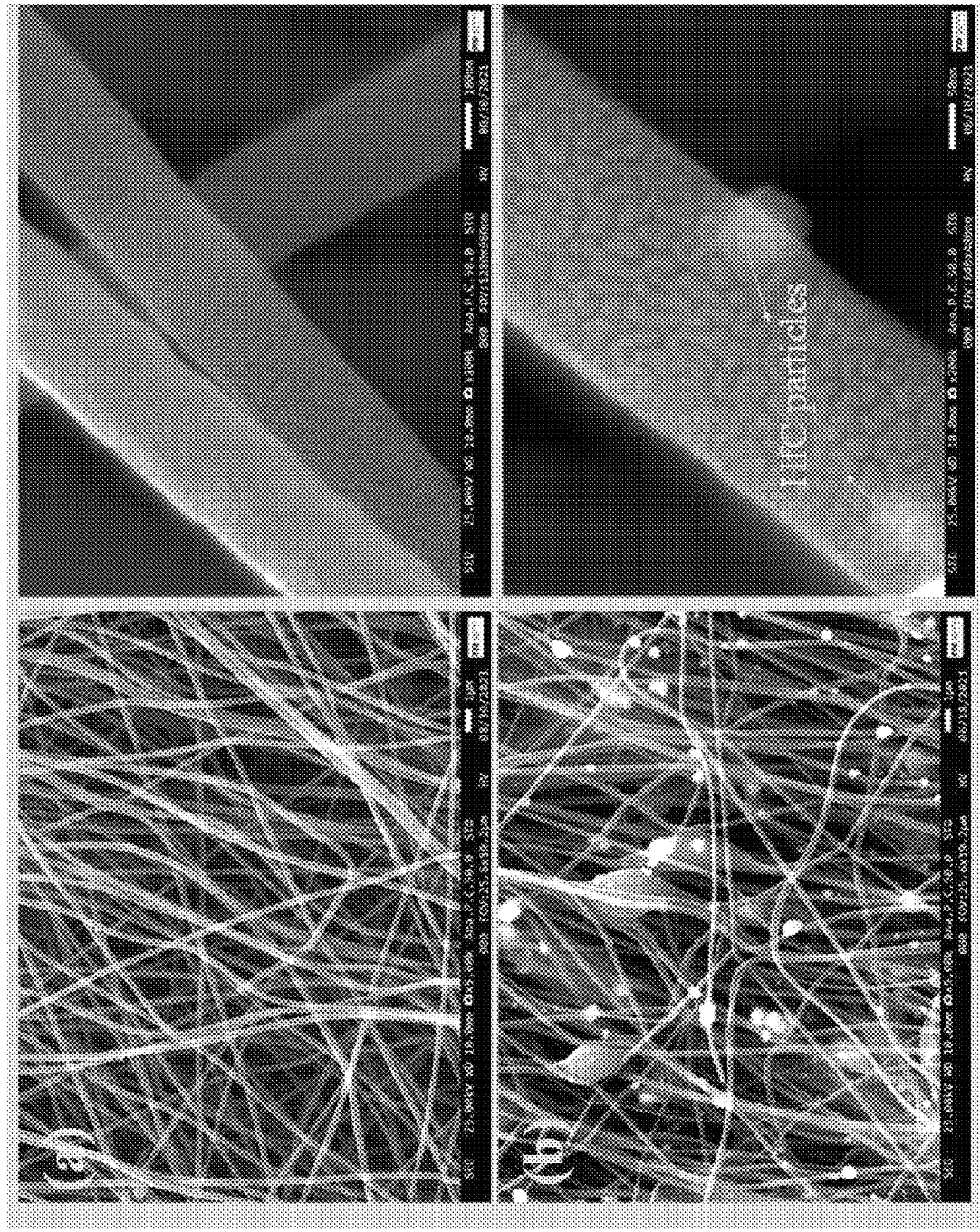
FIG. 4(a) shows two SEM images of a Cnf mat, according to an embodiment of the subject invention, at different magnification levels. The scale bars for the two images are 1 µm (left) and 100 nanometers (nm) (right).
FIG. 4(b) shows two SEM images of HfC-Cnf, according to an embodiment of the subject invention, at different magnification levels. The scale bars for the two images are 1 µm (left) and 50 nm (right).
Figure 5A:
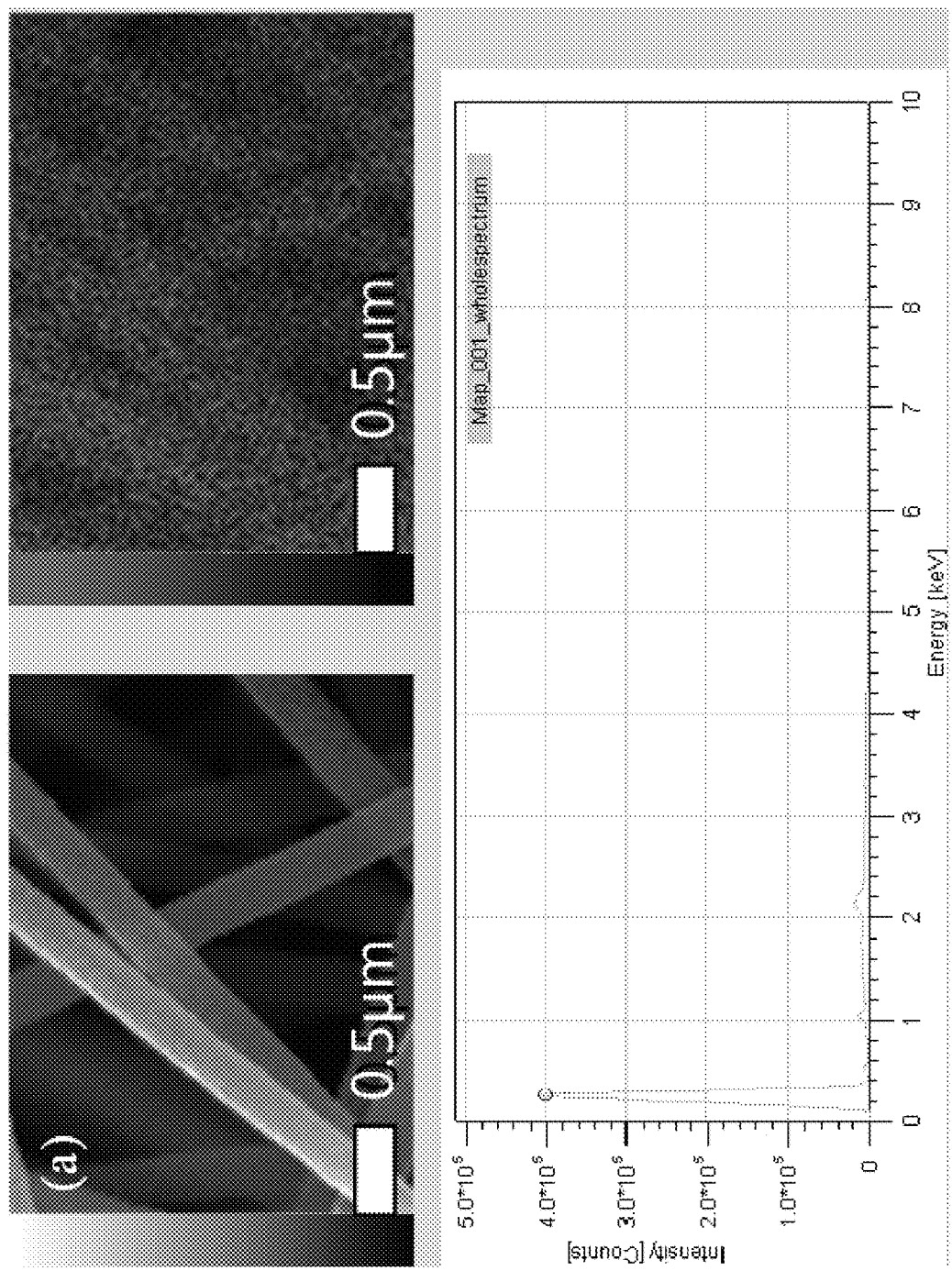
FIG. 5(a) shows an SEM image and the corresponding energy dispersive spectroscopy (EDS) elemental map of a Cnf mat, according to an embodiment of the subject invention, at different magnification levels; the bottom portion is a plot of intensity (counts) versus energy (in kilo-electron Volts (keV)), showing the EDS spectra for the Cnf mat. The scale bar for both images is 0.5 µm. The EDS shows the presence of only elemental carbon (C). The tiny unlabeled peaks correspond to gold (Au), as the samples were Au-coated before performing the SEM study.
Figure 5B:
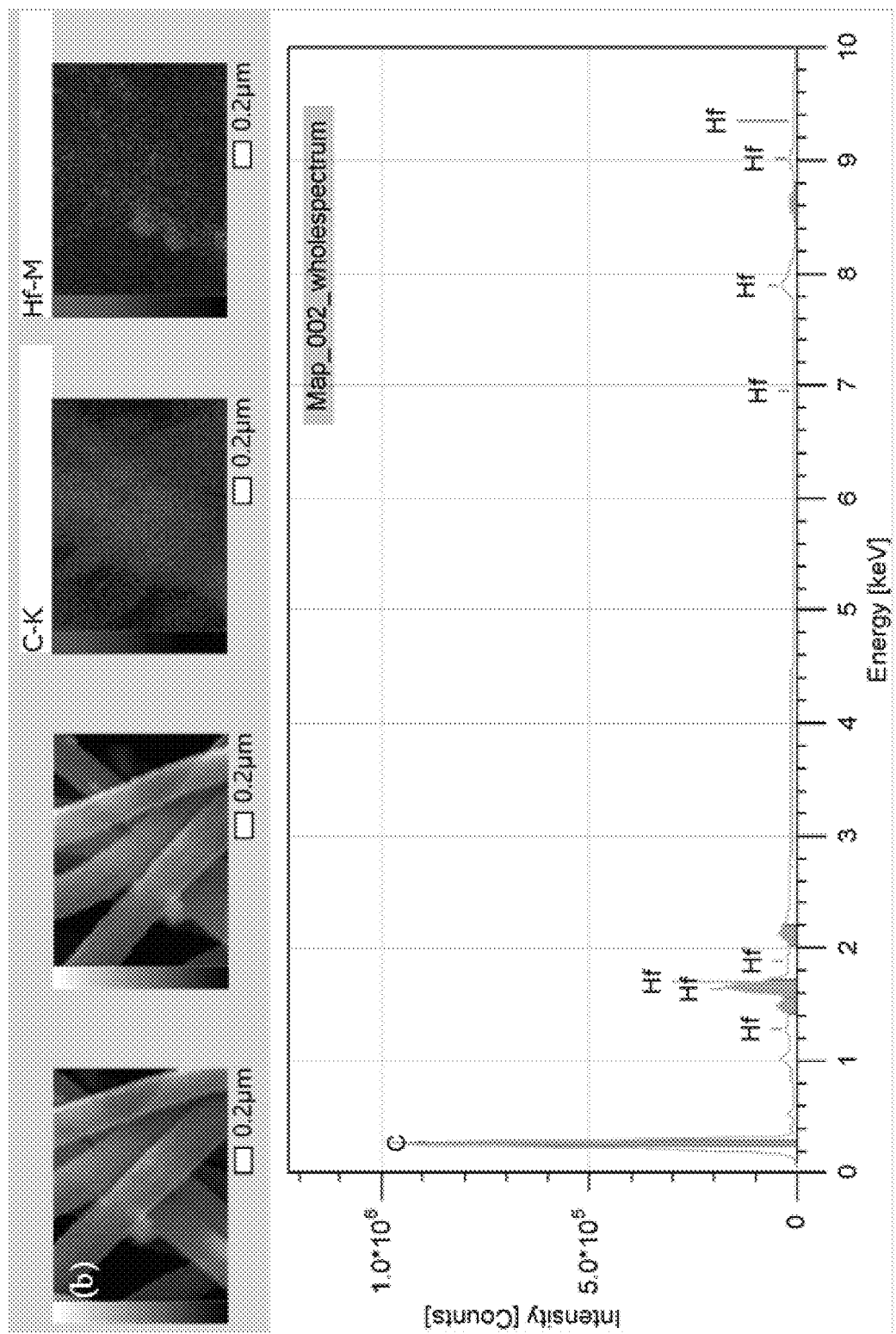
FIG. 5(b) shows the SEM images and corresponding EDS elemental map of HfC-Cnf, according to an embodiment of the subject invention, at different magnification levels; the bottom portion is a plot of intensity (counts) versus energy (in keV), showing the EDS spectra for the HfC-Cnf. The scale bar for all four images is 0.2 µm. The EDS shows uniform distribution of HfC on the Cnf mat. The tiny unlabeled peaks correspond to gold (Au), as the samples were Au-coated before performing the SEM study.

The microstructure of the Cnf and the HfC-Cnf confirms the presence of uniform distribution of HfC (FIG. 4(b)). The EDS mapping to show the presence of HfC particles all over Cnf is presented in FIG. 5(b).

Figure 6:
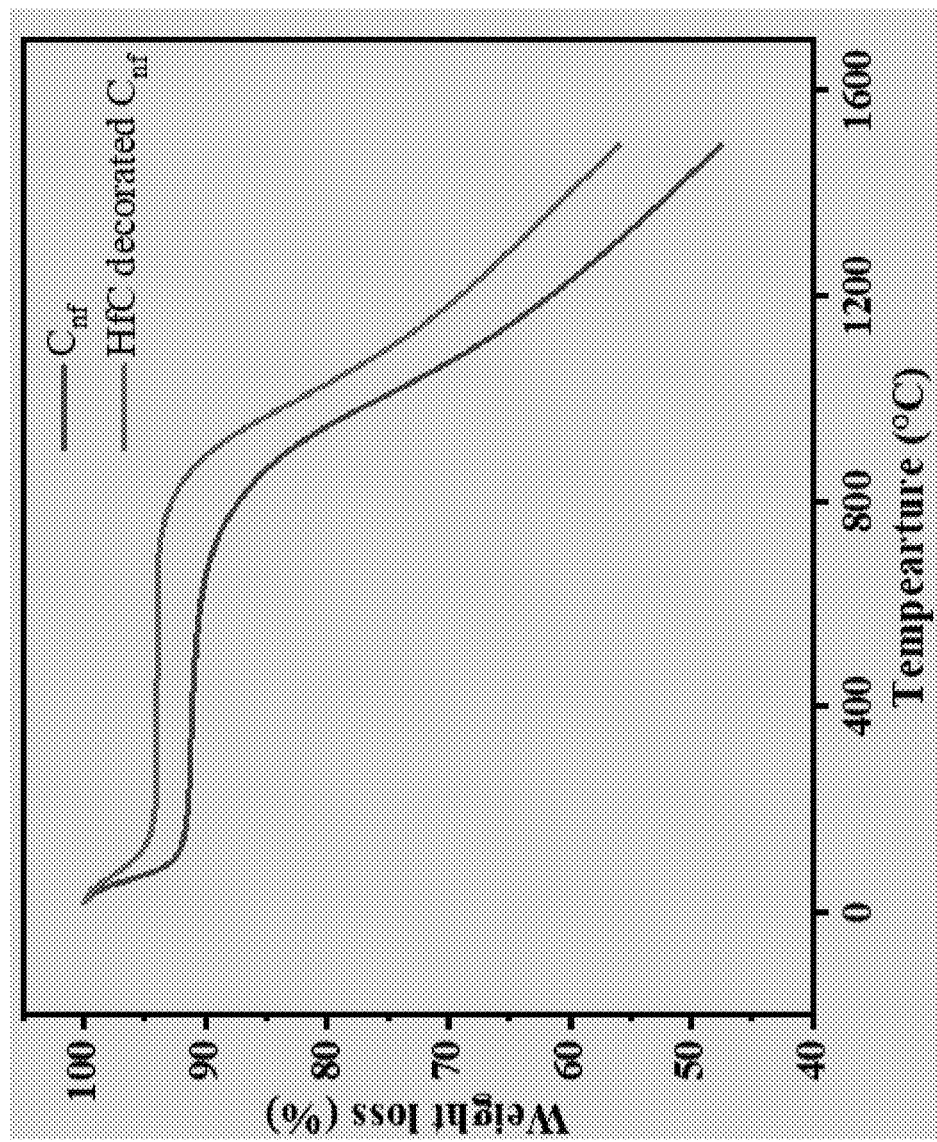
FIG. 6 shows a plot of weight loss (in %) versus temperature (in °C.), showing a thermogravimetric analysis (TGA) for a Cnf and HfC-Cnf. The curve with the higher weight loss % at 800° C. is for the HfC-Cnf; and the curve with the lower weight loss % at 800° C. is for the Cnf. The TGA depicts the enhanced thermal stability of the HfC-Cnf over the Cnf.

FIG. 6 shows a thermogravimetric analysis (TGA) for the Cnf and the HfC-Cnf. This analysis up to 1500° C. shows that the weight loss is less in HfC-Cnf (i.e., residual weight is less than 45% for Cnf and greater than 55% for HfC-Cnf).

Figure 7:
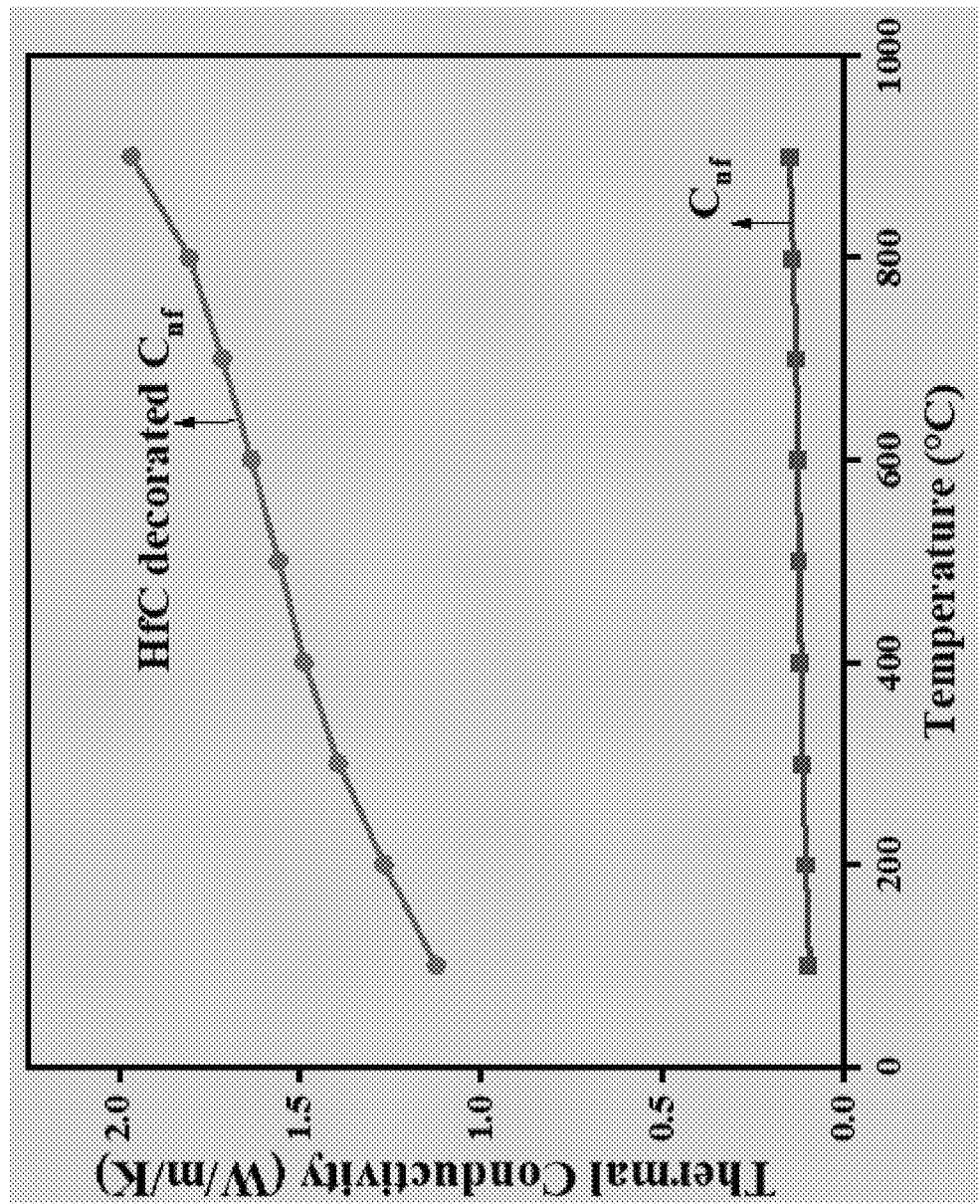
FIG. 7 shows a plot of thermal conductivity (in Watts per meter per Kelvin (W/m-K)) versus temperature (in °C.) for HfC-Cnf and Cnf. The curve with the higher thermal conductivity values is for the HfC-Cnf; and the curve with the lower thermal conductivity values is for the Cnf. This plot depicts the enhanced thermal conductivity of the HfC-Cnf over the Cnf.

FIG. 7 shows a plot of thermal conductivity for the HfC-Cnf and the Cnf. A 20-fold increase in the thermal conductivity of HfC-Cnf compared to Cnf can be seen. The thickness of the Cnf was 85.4±3.4 μm and the thickness of the HfC-Cnf was 194.0±4.9 μm, measured using an optical profilometer. The density of Cnf and HfC-Cnf was 1.68±0.05 grams per cubic centimeter (g/cc) and 5.23±0.08 g/cc, respectively, measured using a helium (He) pycnometer. The effect of both thickness and density was accounted for while measuring the thermal conductivity.

It is noted that the prepared solution with or without the HfC nanoparticles added thereto is not a precursor (i.e., this method did not utilize a precursor, as methods of embodiments of the subject invention do not require a precursor). A precursor is a compound that participates in a chemical reaction that produces UHTC nanoparticles (e.g., HfC or HfC-SiC). The precursors used to prepare HfC include hafnium (IV) acetylacetonate, hafnium (IV) tert-butoxide, and hafnium (IV) tetrachloride. Precursors (as used with Methods 1, 2, and 4 mentioned in FIG. 17) have several limitations, including: a high pyrolyzation/sintering temperature of 1300° C.-2200° C. is required (see FIG. 17, Method 4 (1500° C.-2200° C.)); the final fiber product has defects such as voids and pores due to thermal decomposition of precursors (see FIGS. 18(b), 19(b), 21(a), and 21(b)); a low HfC incorporation/yield rate (see FIGS. 18(b) and 19(b)); and poor flexibility due to large fiber diameter (e.g., 260 nm-980 nm, or 340 nm (see FIG. 17, Methods 1 and 2, respectively)) or filled/compacted structure (see FIGS. 21(a) and 21(b)). Preparing a solution with HfC nanoparticles added thereto and utilizing such a solution in the fabrication (as in this Example 1) has many advantages, including: low carbonation/pyrolyzation temperature (e.g., 800° C.); small fiber diameter (e.g., 100 nm-200 nm); high HfC incorporation rate (e.g., 50%; see FIGS. 2(a)-2(c)); and super flexibility (see FIGS. 1(a) and 1(b)) and yarn formability (see FIGS. 2(a) — 2(c)).

Example 2

Figure 8:
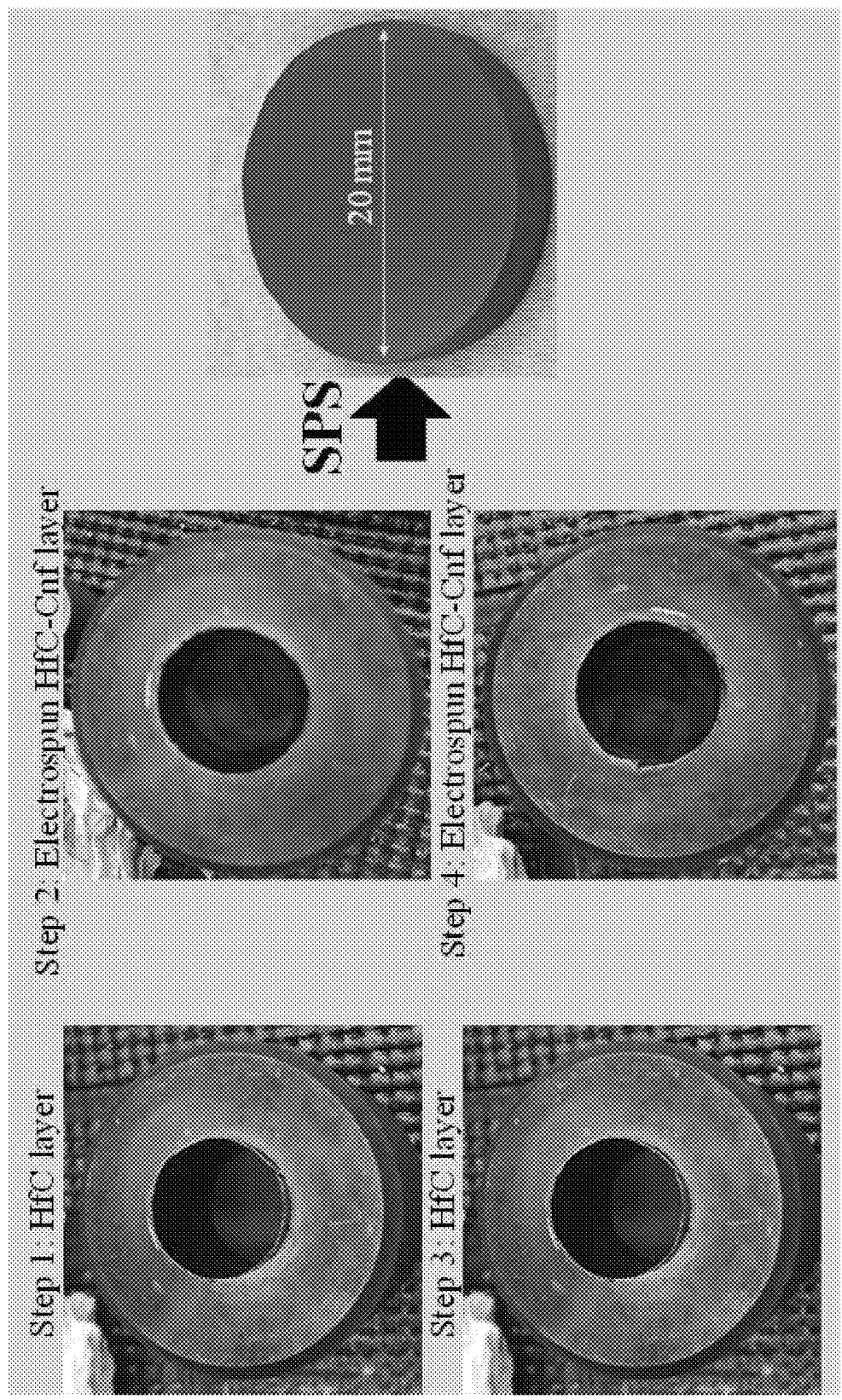
FIG. 8 shows an image of steps for fabricating a multi-layered structure of an HfC-Cnf with an HfC matrix. Although the image at the right shows a diameter, this is for exemplary purposes only and should not be construed as limiting.

A HfC-Cnf mat was fabricated according to the process described in Example 1. It was then used as a filler material for joining UHTCs (i.e., to demonstrate spark plasma joining of UHTCs). With this, the enhanced toughness of the joint when integrated as a multi-layer in UHTCs by spark plasma sintering (SPS) was also demonstrated. In this regard, stepwise layered configuration with a powder bed of HfC (layer thickness of about 1 millimeter (mm)), followed by the HfC-Cnf mat, another layer of HfC powder, followed by HfC-Cnf mat, and a final layer of HfC powder was assembled inside a graphite die and sintered using SPS. This is depicted in FIG. 8. The SPS parameters were configured for sintering at 1850° C. with uniaxial pressure of 60 megapascals (MPa) for 10 minutes (min). The SEM images along the cross-section show the presence of HfC-Cnf at the interface even after intense SPS processing; see FIG. 9. The fractured micrographs show the dangling HfC-Cnf throughout the interface, which can provide high toughness to the matrix via crack deflections and pull-out mechanisms (see also FIG. 10).

Figure 11:
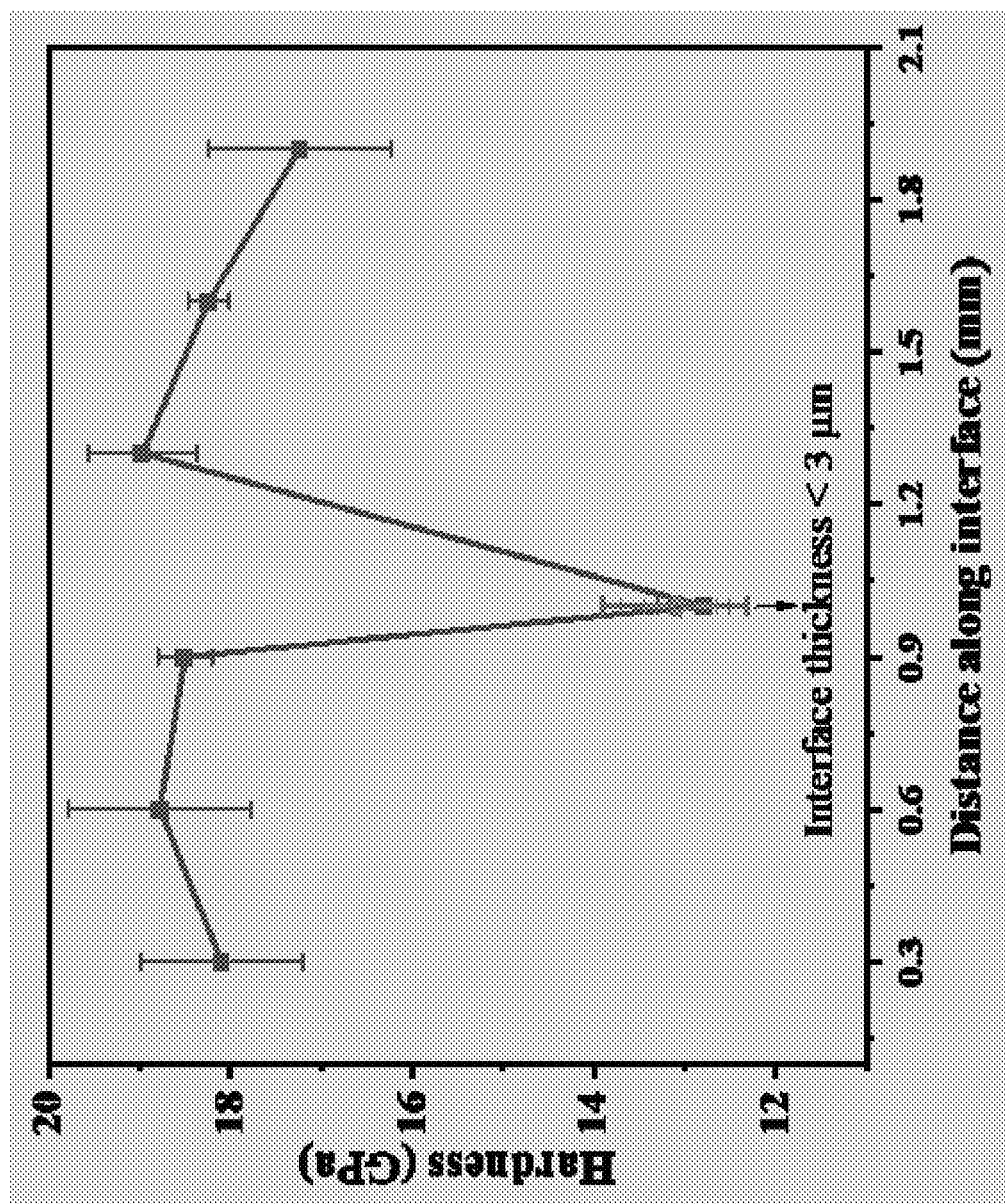
FIG. 11 shows a plot of hardness (in gigapascals (GPa)) versus distance along interface (in millimeters (mm)), showing a hardness profile of the multi-layered structure in HfC matrix through the HfC-Cnf interface.

FIG. 11 shows the hardness profile along with the interface, with hardness values at the interface of the HfC matrix and HfC-Cnf being lower. However, the hardness values at the interface of the HfC matrix and HfC-Cnf are still in the range of that of the matrix to be able to sustain the similar load-bearing capabilities.

Figure 12:
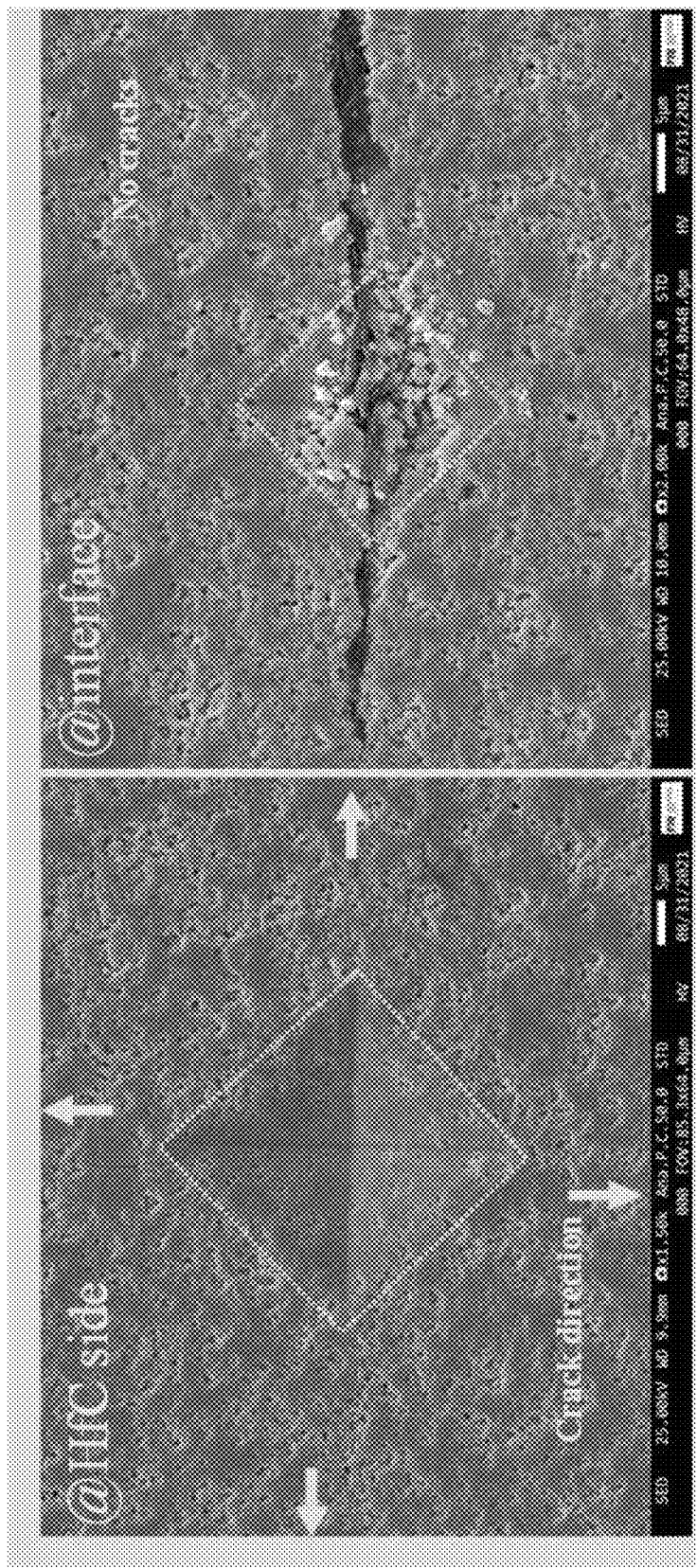
FIG. 12 shows two SEM images of indent post high-load indentation (50 Newtons (N)) on the HfC matrix side and HfC-Cnf interface, respectively, according to an embodiment of the subject invention. The scale bar for each image is 5 µm. These micrographs show the high load-bearing capabilities of the interface of HfC-Cnf when compared to the HfC matrix. The left image shows that the HfC matrix has cracks propagating in all four directions when indented with a load of 50 N while the right image shows that no cracks occurred when the interface was indented with the same 50 N load.
Figure 13:
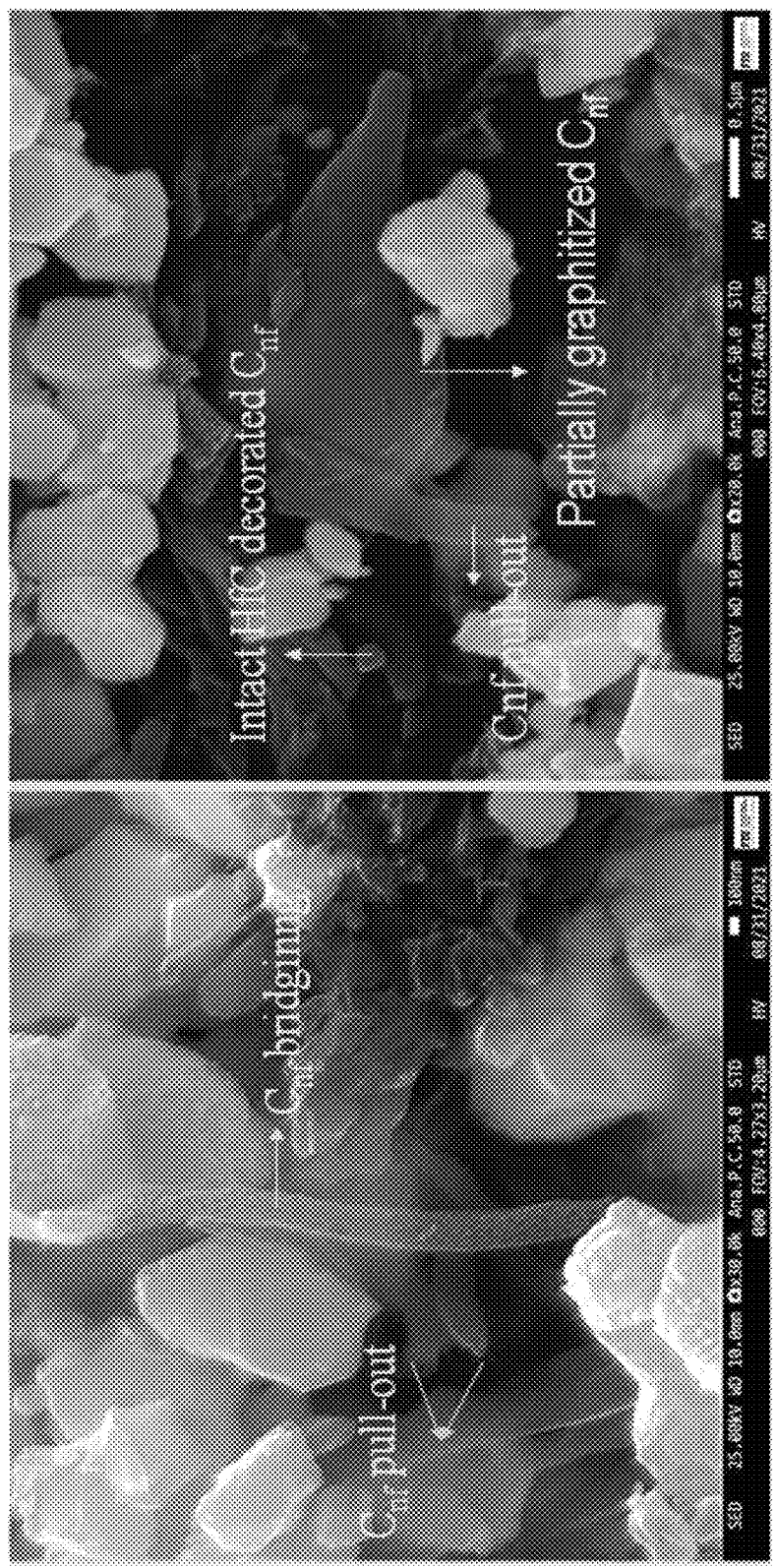
FIG. 13 shows two high magnification SEM images of the multi-layered structure of HfC-Cnf in HfC matrix, according to an embodiment of the subject invention. The scale bars for the two images are 100 nm (left image) and 0.5 µm (right image). These micrographs show the high toughness of the interface of HfC and Cnf via fiber bridging and fiber pull-out mechanism.

Referring to FIG. 12, the high load Vickers' indentation (at 50 Newtons (N)) on the HfC matrix side shows crack propagation in all four directions, but no cracks were seen when the same load was applied at the HfC-Cnf interface. This shows that the interface is stronger than the HfC matrix. The high toughness of the interface can also be seen from the impact area of indent on the matrix side (661.1 square micrometers ($\mu m^2$)) being bigger than that on the interface (290.8 $\mu m^2$). The stronger interface as compared to the matrix can also be seen from the microstructural features such as intact HfC-Cnf, pull-out and bridging mechanism of HfC-Cnf, and partial collapse in the Cnf structure while SPS processing or high load impact during indentation (see FIG. 13).

Example 3

Figures 14A, 14B, 14C:
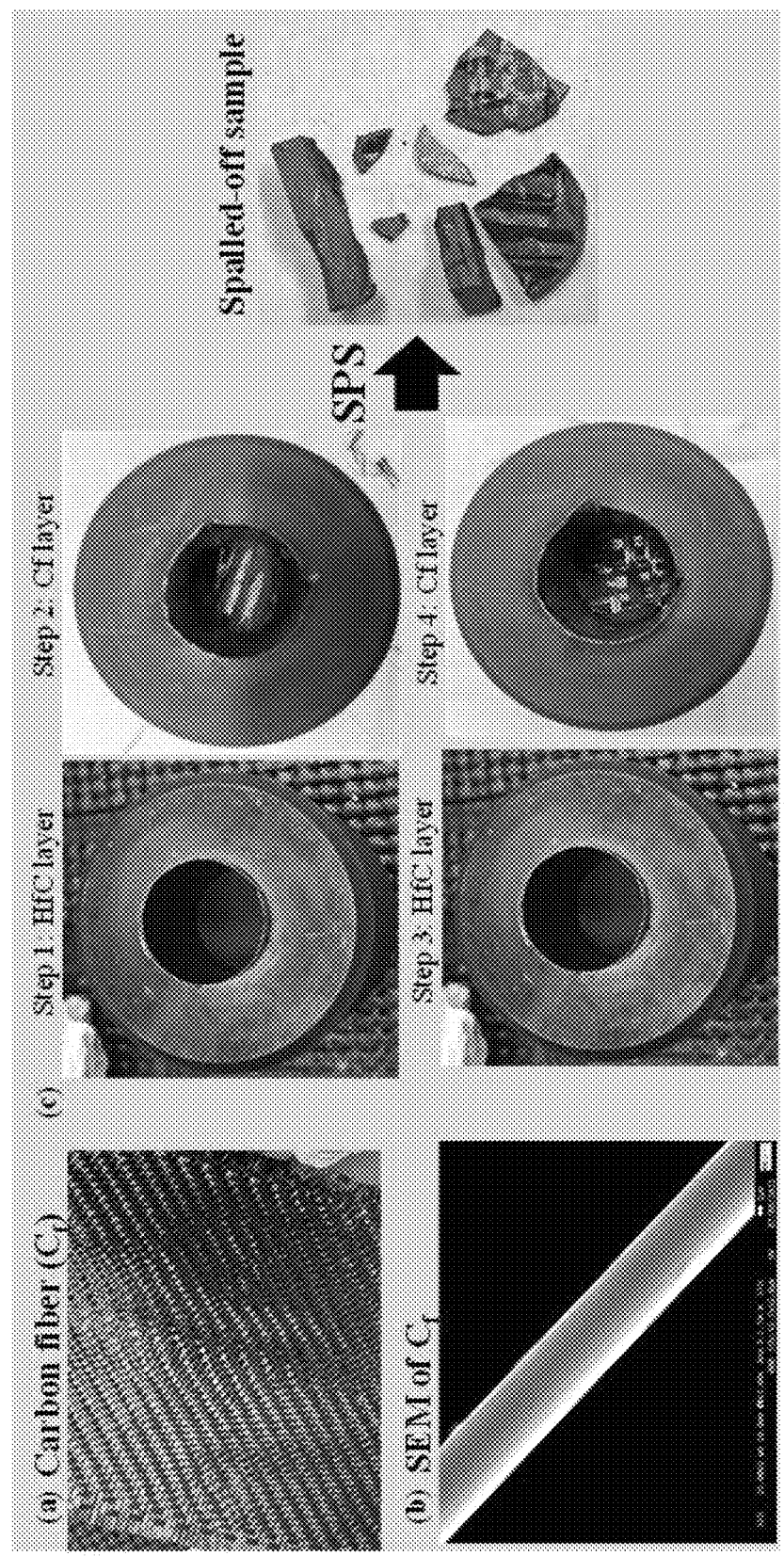
FIG. 14(a) shows an image of a procured carbon fiber (Cf).
FIG. 14(b) shows an SEM image of a procured Cf, showing a diameter of the fiber of about 5-10 µm. The scale bar is 1 µm.
FIG. 14(c) shows an image of steps for fabricating a procured Cf with an HfC matrix. The sample spalled off after SPS processing.
Figure 15:
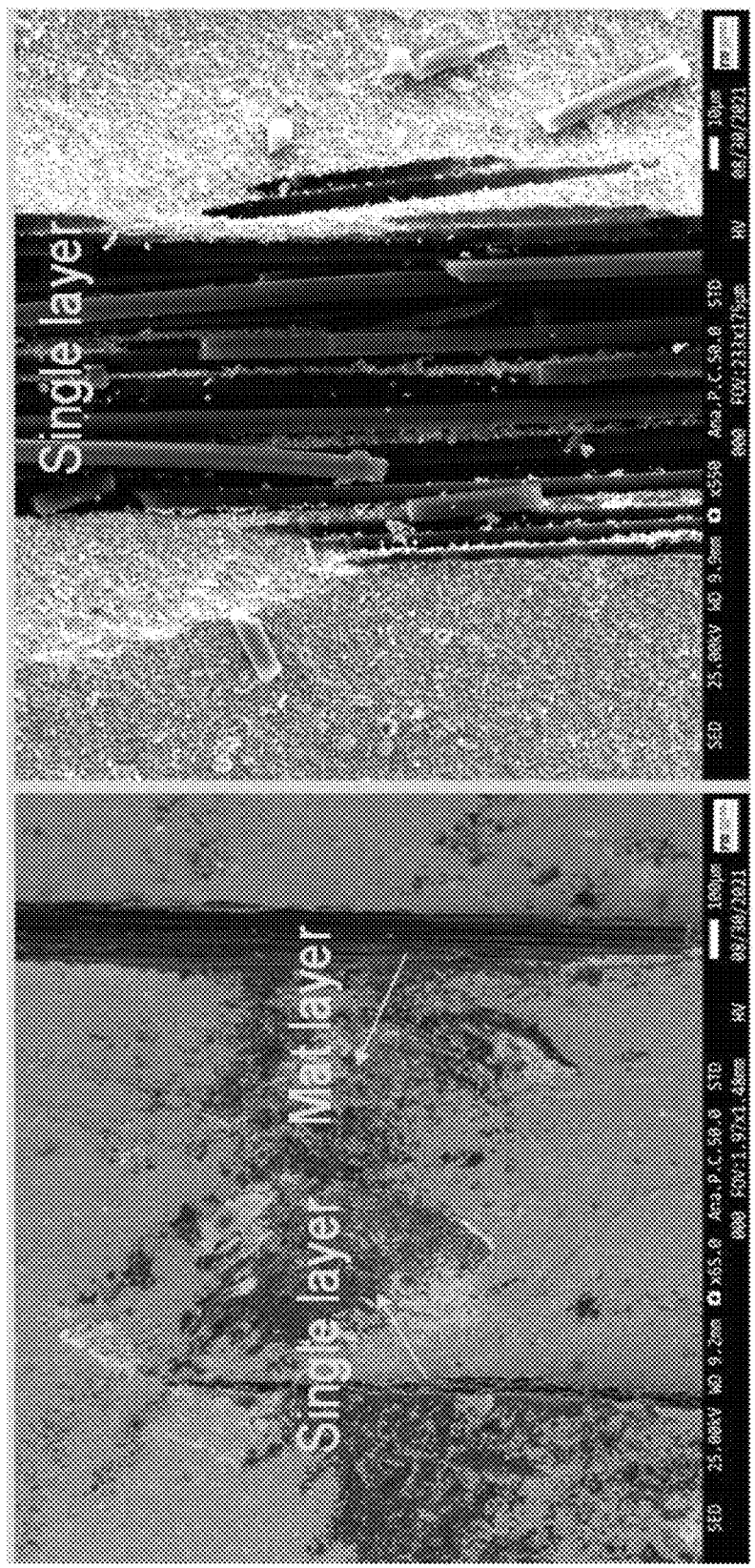
FIG. 15 shows two SEM images of a procured Cf mat with an HfC matrix. The scale bars for the two images are 100 µm (left image) and 10 µm (right image). These micrographs, in particular the right image) show weak bonding and rupture of the Cf structure after SPS processing.
Figures 16A, 16B:
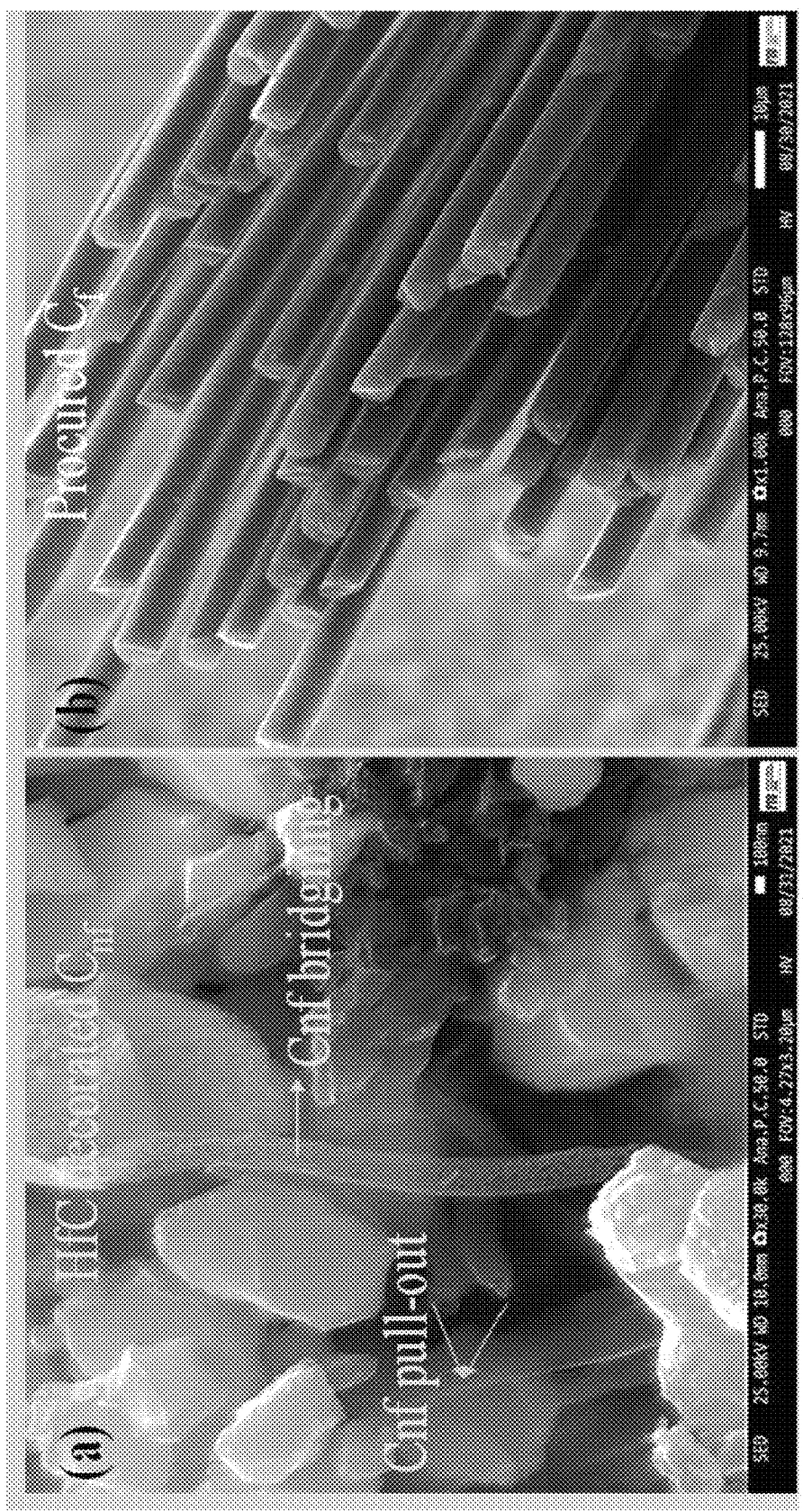
FIG. 16(a) shows an SEM image of HfC-Cnf with HfC matrix, according to an embodiment of the subject invention, showing enhanced toughness due to strong bonding of HfC-Cnf mat with HfC matrix leading to pull-out and bridging mechanism. The scale bar is 100 nm.
FIG. 16(b) shows an SEM image of a Cf with an HfC matrix, showing spallation of the sample due to the weak bonding of the Cf with the HfC matrix. The scale bar is 10 µm.

A comparison was performed between a HfC-Cnf mat fabricated according to the process described in Example 1 versus procured Cf as a multi-layered structure in UHTCs by SPS. FIG. 14(a) shows an image of the Cf, and FIG. 14(b) shows an SEM image of the Cf. Similar to the fabrication of the HfC-Cnf mat, the procured Cf was processed into a multi-layered structure with an HfC matrix. The stepwise process is shown in FIG. 14(c). The sample spalled off after being removed from the SPS die after processing due to the poor-bonding, excess Cf, and larger size of Cf as compared to Cnf. The fractured micrograph of the Cf with HfC matrix is shown in FIG. 15. FIGS. 16(a) and 16(b) show the comparison of the fractured micrographs, which showed good bonding of the HfC-Cnf with HfC matrix leading to tough multi-layer structure (FIG. 16(a)) and poor bonding of Cf with HfC leading to spallation of the sample (FIG. 16(b)).

Figure 9:
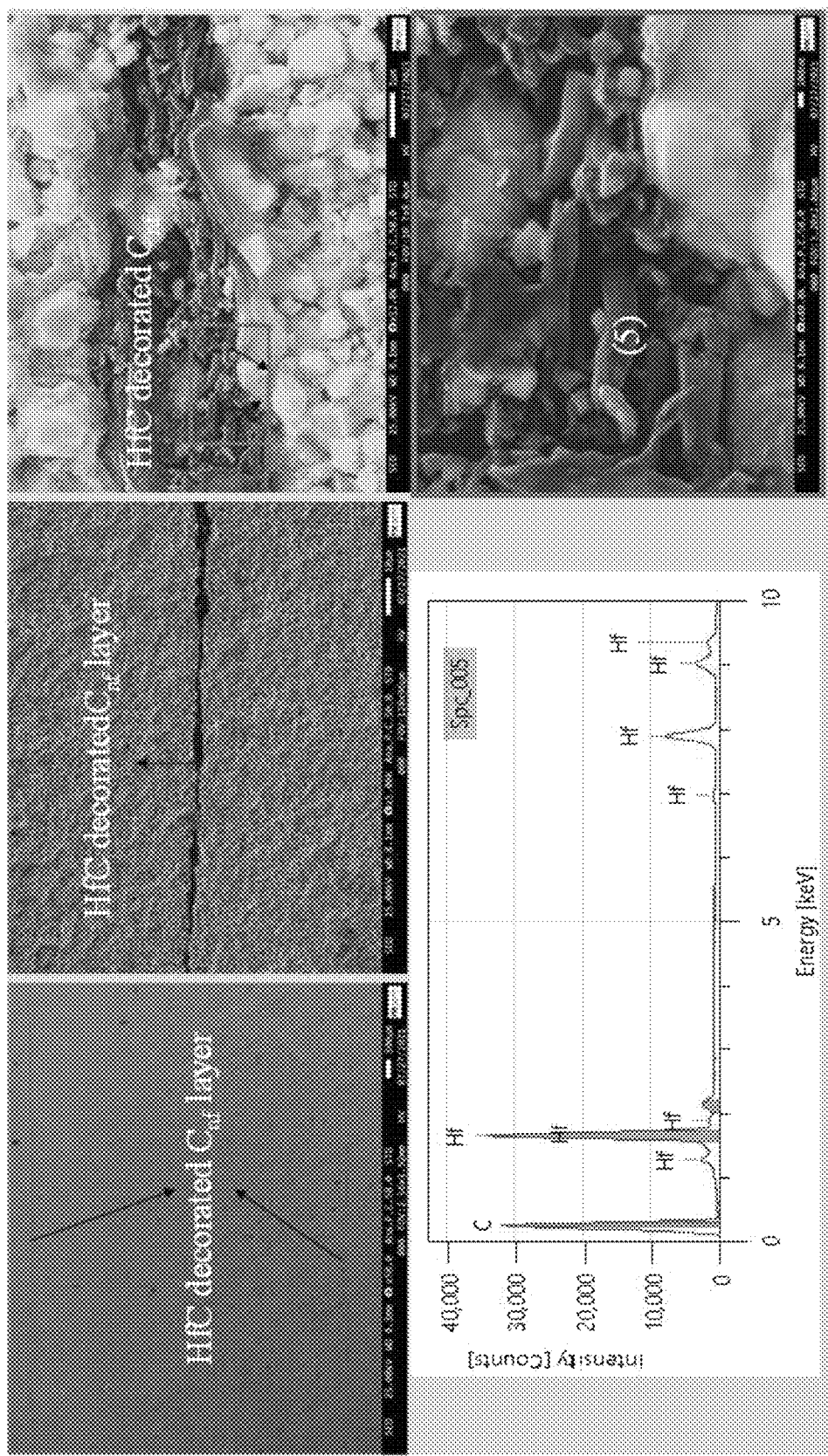
FIG. 9 shows four SEM images of a multi-layered structure of an HfC-Cnf with an HfC matrix, according to an embodiment of the subject invention, at different magnification levels; the bottom-left portion is a plot of intensity (counts) versus energy (in keV), showing the EDS spectra at a point marked as (5) in the corresponding SEM image for the multi-layered structure of the HfC-Cnf with the HfC matrix. The scale bars for the four images are 100 µm (top-left), 10 µm (top-middle), 1 µm (top-right), and 100 nm (bottom-right). The images show that the HfC-Cnf survived even after spark plasma sintering (SPS).
Figure 10:
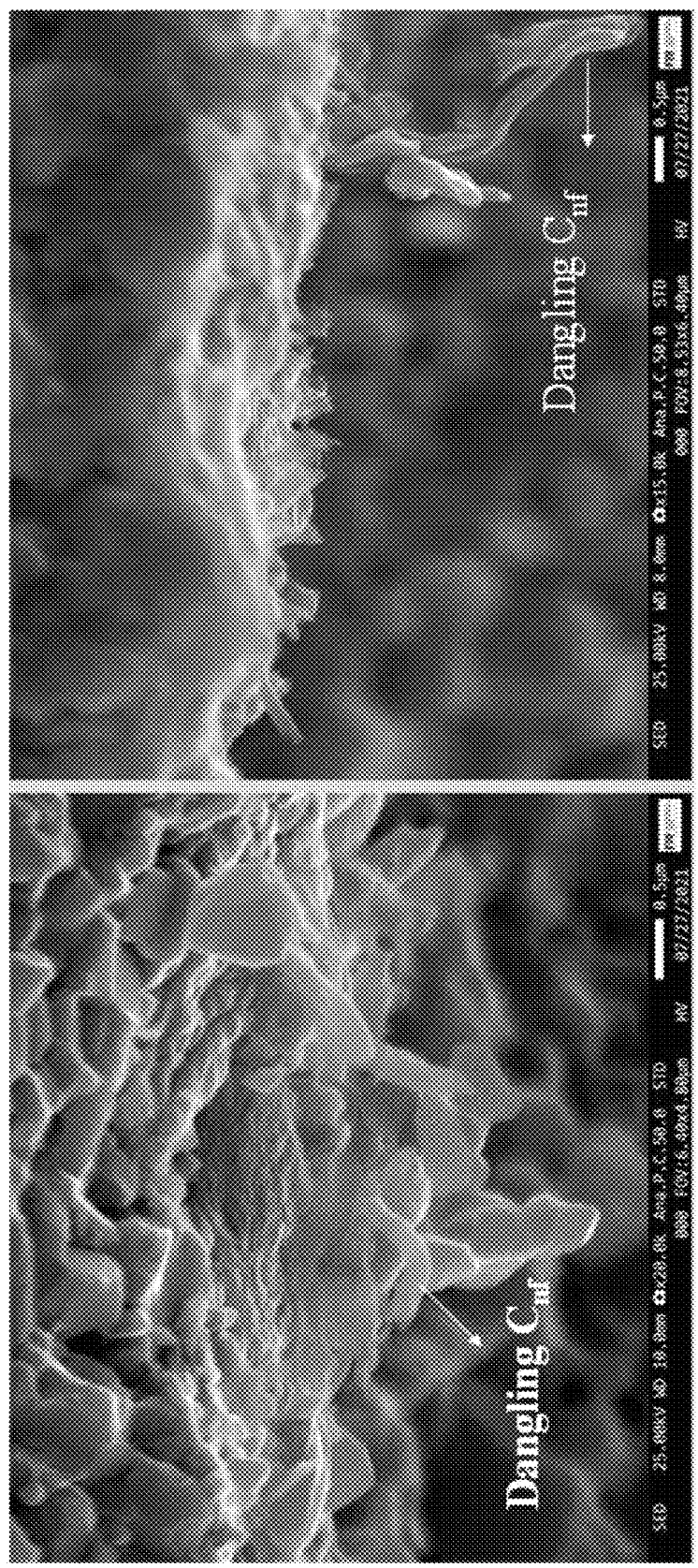
FIG. 10 shows two high magnification SEM images of the multi-layered structure of an HfC-Cnf with an HfC matrix, according to an embodiment of the subject invention. The scale bar for each image is 0.5 µm. These fractured micrographs show dangling HfC-Cnf throughout the interface.

The comparison demonstrated the successful integration of the multi-layered structure with the HfC-Cnf mat while retaining its structure even during the extreme SPS processing conditions (see also FIGS. 8-10). A similar multi-layered structure could not be replicated via procured Cf (see FIGS. 14(a)-14(c), 15, and 16(b)).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for fabricating a hybrid carbon nanofiber (Cnf) product decorated with particles, the method comprising:
   performing an electrospinning process on an electrospinning solution to give an intermediate product, the electrospinning solution comprising an organic compound and the particles; and
   performing a carbonization process on the intermediate product to give the Cnf product decorated with the particles,
   the carbonization process being performed under a vacuum condition,
   the carbonization process comprising:
   disposing the intermediate product on a surface of a predetermined shape; and
   performing an initial heating stage on the intermediate product on the surface at a first predetermined temperature for a first predetermined time, a plurality of intermediate heating stages on the intermediate product on the surface at respective predetermined temperatures for respective predetermined times, and a cooling stage on the intermediate product on the surface to cool the intermediate product from the predetermined temperature of a last stage of the plurality of intermediate heating stages to an ambient temperature, and the initial heating stage and the plurality of intermediate heating stages being preformed under the vacuum condition.

2. The method according to claim 1, further comprising preparing the electrospinning solution before performing the electrospinning process, the preparing of the electrospinning solution comprising:
   dissolving the organic compound in a solvent to give a first intermediate solution;
   adding the particles to the first intermediate solution to give a second intermediate solution; and
   ultra-sonicating the second intermediate solution for a predetermined time to give the electrospinning solution.

3. The method according to claim 2, the organic compound being an organic polymer.

4. The method according to claim 1, the organic compound being an organic polymer.

5. The method according to claim 1, the particles being nanoparticles.

6. The method according to claim 1, the particles being ultra-high temperature ceramic (UHTC) particles.

7. The method according to claim 1, the particles being UHTC nanoparticles.

8. The method according to claim 1, the particles being hafnium carbide (HfC) nanoparticles.

9. The method according to claim 1, the plurality of intermediate heating stages comprising at least four intermediate stages,
   the first predetermined temperature being in a range of from 200° C. to 250° C., and
   each respective predetermined temperature of the plurality of intermediate heating stages being in a range of from about 220° C. to about 800° C.

10. The method according to claim 1, the predetermined shape of the surface being a cuboid.

11. The method according to claim 1, the hybrid Cnf product being a hybrid Cnf mat.

12. A method for fabricating a hybrid carbon nanofiber (Cnf) product decorated with particles, the method comprising:
   preparing an electrospinning solution by dissolving an organic polymer in a solvent to give a first intermediate solution, adding the particles to the first intermediate solution to give a second intermediate solution, and ultra-sonicating the second intermediate solution for a predetermined time to give the electrospinning solution;
   performing an electrospinning process on the electrospinning solution to give an intermediate product, the electrospinning solution comprising the organic polymer and the particles; and
   performing a carbonization process on the intermediate product to give the Cnf product decorated with the particles,
   the particles being hafnium carbide (HfC) nanoparticles,
   the carbonization process comprising:
   disposing the intermediate product on a surface of a predetermined shape; and
   performing an initial heating stage on the intermediate product on the surface at a first predetermined temperature for a first predetermined time, a plurality of intermediate heating stages on the intermediate product on the surface at respective predetermined temperatures for respective predetermined times, and a cooling stage on the intermediate product on the surface to cool the intermediate product from the predetermined temperature of a last stage of the plurality of intermediate heating stages to an ambient temperature, the initial heating stage and the plurality of intermediate heating stages being performed under a vacuum condition, the plurality of intermediate heating stages comprising at least four intermediate stages, the first predetermined temperature being in a range of from 200° C. to 250° C., each respective predetermined temperature of the plurality of intermediate heating stages being in a range of from about 220° C. to about 800° C., the predetermined temperature of the last stage of the plurality of intermediate heating stages being about 800° C., the predetermined shape of the surface being a cuboid, and the hybrid Cnf product being a hybrid Cnf mat.

* * * * *